(12) United States Patent
Li et al.

(10) Patent No.: US 11,902,446 B2
(45) Date of Patent: Feb. 13, 2024

(54) METHOD FOR RECORDING DATA BLOCK ON BLOCKCHAIN, LEADER ACCOUNTING NODE, AND STORAGE MEDIUM

(71) Applicant: TENCENT TECHNOLOGY (SHENZHEN) COMPANY LIMITED, Guangdong (CN)

(72) Inventors: Mao Cai Li, Shenzhen (CN); Hu Lan, Shenzhen (CN); Zong You Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 423 days.

(21) Appl. No.: 17/229,352

(22) Filed: Apr. 13, 2021

(65) Prior Publication Data

US 2021/0234703 A1    Jul. 29, 2021

Related U.S. Application Data

(63) Continuation of application No. PCT/CN2020/075976, filed on Feb. 20, 2020.

(30) Foreign Application Priority Data

Feb. 21, 2019 (CN) .......................... 201910130823.9

(51) Int. Cl.
*H04L 9/32* (2006.01)
*G06F 21/60* (2013.01)
*H04L 9/30* (2006.01)

(52) U.S. Cl.
CPC .......... *H04L 9/3239* (2013.01); *G06F 21/602* (2013.01); *H04L 9/30* (2013.01)

(58) Field of Classification Search
CPC . H04L 9/3239; H04L 9/30; H04L 9/50; G06F 21/602; G06F 21/64; G06F 16/22; G06F 16/27; G06F 16/182
See application file for complete search history.

(56) References Cited

U.S. PATENT DOCUMENTS

2016/0028552 A1\* 1/2016 Spanos ................. H04L 9/3268
                                                          713/178
2017/0236123 A1    8/2017 Ali et al.
(Continued)

FOREIGN PATENT DOCUMENTS

CN    107480990 A    12/2017
CN    107767478 A     3/2018
(Continued)

OTHER PUBLICATIONS

Qi et al., "A Cascade Structure for Blockchain", Aug. 2018, 1st IEEE International Conference on Hot Information-Centric Networking, pp. 252-253 (Year: 2018).\*
(Continued)

*Primary Examiner* — Kenneth W Chang
(74) *Attorney, Agent, or Firm* — Sughrue Mion, PLLC

(57) ABSTRACT

The disclosure provides a method for recording a data block on a blockchain, a leader accounting node, and a storage medium. The method includes: generating a target data block; determining whether the plurality of branch blockchains include a branch blockchain having at least one data block waiting to be added onto the blockchain and for which no consensus has been reached; based on a determination that first branch blockchains have no data block waiting to be added onto the blockchain and for which no consensus has been reached, selecting, from the first branch blockchains, a branch blockchain for recording the target data block; recording a digest value of a previous data block recorded on the selected first branch blockchain in a block (Continued)

header of the target data block; and transmitting the target data block to other accounting nodes in the group of accounting nodes for reaching a consensus.

18 Claims, 17 Drawing Sheets

(56) References Cited

U.S. PATENT DOCUMENTS

| | | | | |
|---|---|---|---|---|
| 2017/0344435 | A1* | 11/2017 | Davis | G06F 11/1464 |
| 2017/0344987 | A1* | 11/2017 | Davis | H04L 9/321 |
| 2019/0034465 | A1* | 1/2019 | Shimamura | G06F 16/23 |
| 2019/0251187 | A1* | 8/2019 | Lin | G06F 16/1834 |
| 2019/0268138 | A1* | 8/2019 | Mankovskii | G06Q 20/065 |
| 2019/0334697 | A1* | 10/2019 | Winslow | H04L 9/3242 |
| 2019/0340266 | A1* | 11/2019 | Vo | G06F 16/2365 |
| 2020/0250655 | A1* | 8/2020 | Naqvi | G06Q 20/38215 |

FOREIGN PATENT DOCUMENTS

| | | |
|---|---|---|
| CN | 108667632 A | 10/2018 |
| CN | 109241772 A | 1/2019 |
| CN | 109359973 A | 2/2019 |
| CN | 109902091 A | 6/2019 |

OTHER PUBLICATIONS

International Search Report of PCT/CN2020/075976 dated May 20, 2020 [PCT/ISA/210].

Written Opinion of PCT/CN2020/075976 dated May 20, 2020 [PCT/ISA/237].

Translation of Written Opinion of the International Searching Authority dated May 20, 2020 in International Application No. PCT/CN2020/075976.

* cited by examiner

METHOD FOR RECORDING DATA BLOCK ON BLOCKCHAIN, LEADER ACCOUNTING NODE, AND STORAGE MEDIUM

CROSS-REFERENCE TO RELATED APPLICATION(S)

This application is a bypass continuation application of International Application No. PCT/CN2020/075976, entitled "METHOD FOR RECORDING DATA BLOCK ON BLOCKCHAIN, AND LEADER ACCOUNTING NODE AND MEDIUM" and filed Feb. 20, 2020, which claims priority to Chinese Patent Application No. 201910130823.9, entitled "METHOD FOR RECORDING DATA BLOCK ON BLOCKCHAIN, LEADER ACCOUNTING NODE, AND MEDIUM" and filed with the China National Intellectual Property Administration on Feb. 21, 2019, the disclosures of which are herein incorporated by reference in their entireties.

FIELD

The disclosure relates to the field of blockchains, and specifically, to recording a data block on a blockchain.

BACKGROUND

In a blockchain system, an accounting node for recording transaction information on a blockchain needs to send the transaction information to a leader accounting node, the leader accounting node packages the transaction information that needs to be added onto the blockchain into blocks, and each block stores a digest of a previous block. Through this mechanism, blocks are connected in series to form a block chain structure to achieve the effect of tamper-proof. If a block on the blockchain is tampered with, a digest of the block is recorded in a subsequent block, and the digest cannot match that in the tampered block.

SUMMARY

An objective of the disclosure is to improve the efficiency of recording a data block on a blockchain.

According to an aspect of an example embodiment of the disclosure, a method for recording a data block on a blockchain is provided, the blockchain including a plurality of branch blockchains, recording of data blocks on the plurality of branch blockchains being performed by a same group of accounting nodes, the method being performed by a leader accounting node in the group of accounting nodes, the method including:

generating a target data block;

determining whether the plurality of branch blockchains include a branch blockchain having at least one data block waiting to be added onto the blockchain and for which no consensus has been reached;

based on a determination that first branch blockchains, of the plurality of branch blockchains, have no data block waiting to be added onto the blockchain and for which no consensus has been reached, selecting, from the first branch blockchains, a branch blockchain for recording the target data block;

recording a digest value of a previous data block recorded on the selected first branch blockchain in a block header of the target data block; and transmitting the target data block to other accounting nodes in the group of accounting nodes for reaching a consensus, the target data block being recorded on the selected first branch blockchain based on the consensus being reached.

According to an aspect of an example embodiment of the disclosure, a leader accounting node in a blockchain comprising a plurality of branch blockchains is provided, wherein data blocks are recorded on the plurality of branch blockchains by a same group of accounting nodes, and the leader accounting node is selected from the group of accounting nodes, the leader accounting node including:

at least one memory configured to store program code; and at least one processor configured to read the program code and operate as instructed by the program code, the program code including:

target data block generation code configured to cause at least one of the at least one processor to generate a target data block;

determination code configured to cause at least one of the at least one processor to determine whether the plurality of branch blockchains include a branch blockchain having at least one data block waiting to be added onto the blockchain and for which no consensus has been reached in the plurality of branch blockchains;

first branch blockchain selection code configured to cause at least one of the at least one processor to, based on a determination that first branch blockchains, of the plurality of branch blockchains, have no data block waiting to be added onto the blockchain and for which no consensus has been reached, select, from the first branch blockchains, a branch blockchain for recording the target data block;

digest value recordation code configured to cause at least one of the at least one processor to record a digest value of a previous data block recorded on the selected first branch blockchain in a block header of the target data block; and consensus-reached and addition code configured to cause at least one of the at least one processor to transmit the target data block to other accounting nodes in the group of accounting nodes for reaching a consensus, the target data block being recorded on the selected first branch blockchain based on the consensus being reached.

According to an aspect of an example embodiment of the disclosure, a leader accounting node is provided, including: a memory, storing computer-readable instructions; and a processor, configured to read the computer-readable instructions stored in the memory and, from reading the instructions, perform the method according to the above.

According to an aspect of an example embodiment of the disclosure, a non-transitory computer-readable storage medium is provided, storing computer-readable instructions, the computer-readable instructions, when executed by a processor of a computer, causing the processor to perform the method according to the above.

BRIEF DESCRIPTION OF THE DRAWINGS

The above and other objectives, features, and advantages of the disclosure will become more apparent from the detailed description of exemplary embodiments of the disclosure with reference to the accompanying drawings.

DETAILED DESCRIPTION

Figure 1A:
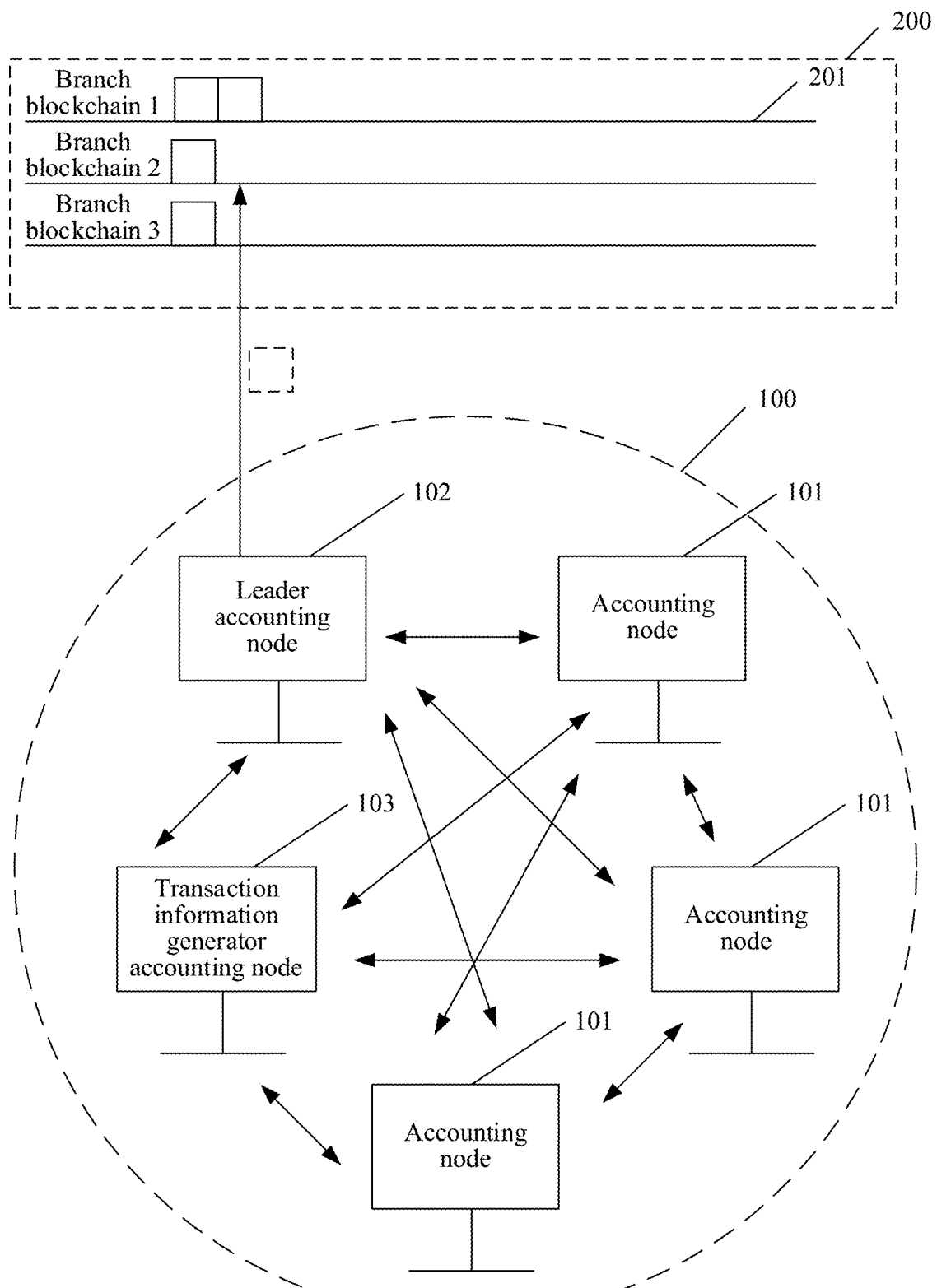
FIG. 1A to FIG. 1C show diagrams of three system architectures of a method for recording a data block on a blockchain according to an embodiment of the disclosure.

The exemplary implementations are described comprehensively with reference to the accompanying drawings. However, the exemplary implementations may be implemented in various forms, and are not understood as being limited to the examples described herein. Conversely, the exemplary implementations are provided to make the descriptions of the disclosure more comprehensive and complete, and completely convey the idea of the exemplary implementations to a person skilled in the art. The accompanying drawings are merely exemplary illustrations of the disclosure and are not necessarily drawn to scale. The same reference numbers in the drawings represent the same or similar parts, and therefore, repeated descriptions thereof are omitted.

In addition, the described features, structures, or characteristics may be combined in one or more exemplary implementations in any appropriate manner. In the following descriptions, specific details are provided to give a comprehensive understanding of the exemplary implementations of the disclosure. However, a person skilled in the art would understand that, the technical solutions in the disclosure may be implemented without one or more of the particular details, or another method, component, operation, and the like may be used. In other cases, well-known structures, methods, implementations, or operations are not shown or described in detail to avoid obscuring aspects of the disclosure.

Some of the block diagrams shown in the accompanying drawings are functional entities and do not necessarily correspond to physically or logically independent entities. Such functional entities may be implemented in the form of software, or implemented in one or more hardware modules or integrated circuits, or implemented in different networks and/or processor apparatuses and/or micro-controller apparatuses.

System architectures and an entire process to which the embodiments of the disclosure are applied are first described below with reference to FIG. 1A to FIG. 1C.

In a system architecture shown in FIG. 1A, a group of accounting nodes 100 includes a plurality of accounting nodes 101, and there is a leader accounting node 102 in the plurality of accounting nodes 101. The leader accounting node 102 may be unchanged, or may be selected from all the accounting nodes 101 periodically. In the system architecture shown in FIG. 1A, each accounting node 101 is also a generator node for generating transaction information, that is, a transaction information generator accounting node 103.

The transaction information generator accounting node 103 generates transaction information that needs to be recorded on a blockchain 200, and sends the transaction information to the leader accounting node 102. The leader accounting node 102 buffers the transaction information instead of adding the transaction information onto the blockchain immediately, and then packages the transaction information into a packet for adding onto the blockchain after a packaging condition (for example, the buffered transaction information reaches a preset quantity or a preset size) is met. As the blockchain 200 includes three branch blockchains 201 (three branch blockchains are shown in the figure, but there may be any quantity other than three), the leader accounting node 102 needs to determine which a branch blockchain 201 to which the packet is recorded. A branch blockchain to which a previous data block of a target data block to be recorded on the blockchain is recorded is a branch blockchain 1, and a consensus has not been reached on the previous data block. According to the related art, a digest can be determined after the consensus is reached on the previous data block, so as to fill in a block header of the target data block. As a result, the efficiency of data block addition is low. There are three branch blockchains in FIG. 1A, and a consensus has been reached on a lastest data block of a branch blockchain 2 and a lastest data block of a branch blockchain 3 except for the branch blockchain 1. Therefore, one of the branch blockchain 2 and the branch blockchain 3 may be selected for data block addition. Because the consensus has been reached on current lastest data blocks of the two branch blockchains, and digests are determined, the digests may be filled in the block header of the target data block. The target data block is added to the branch blockchain after being sent to other accounting nodes 101 in the group of accounting nodes 100 for reaching a consensus, thereby improving the efficiency of block generation.

Figure 1B:
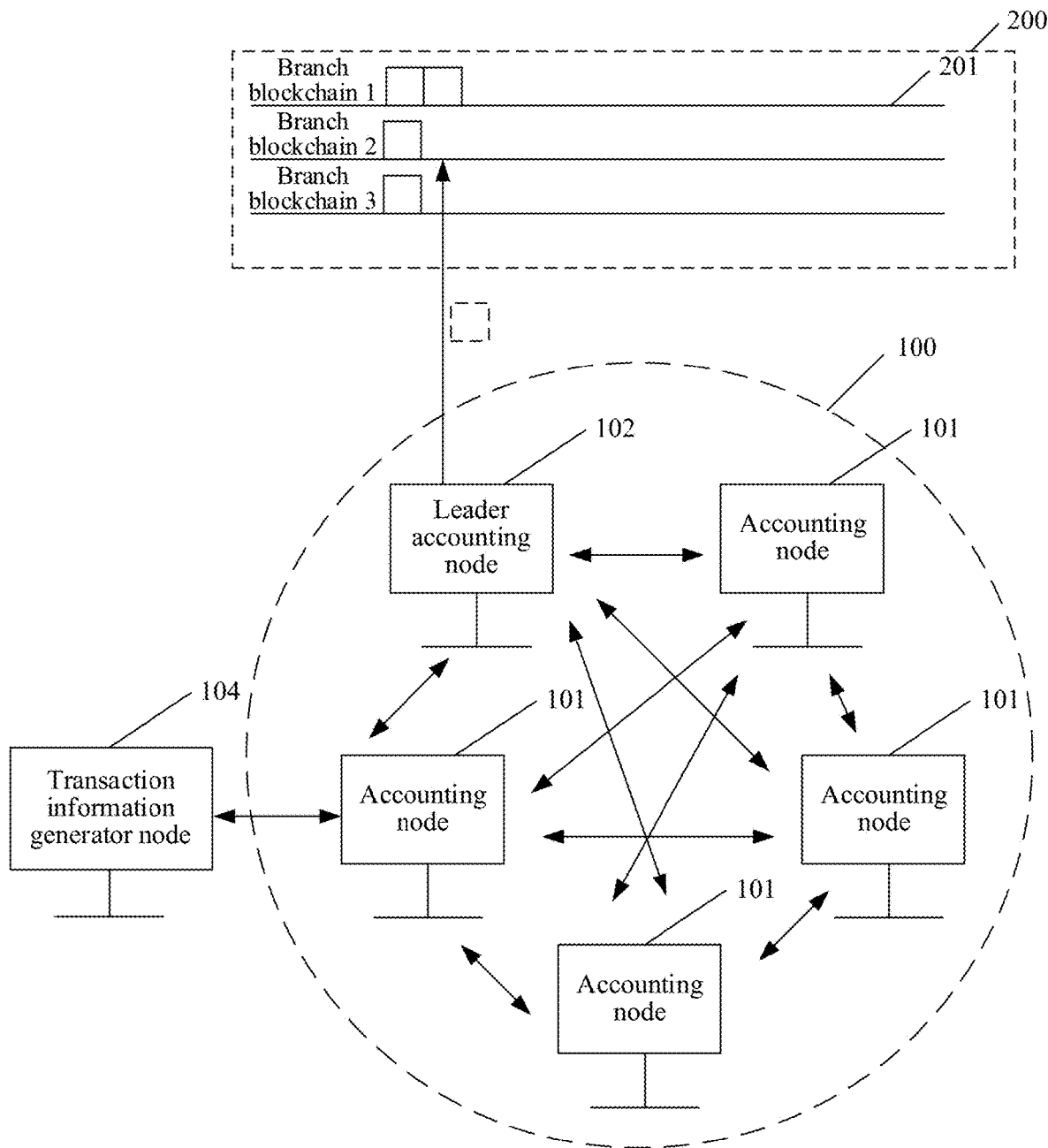

FIG. 1B shows another system architecture to which a method for recording a data block on a blockchain is applied according to an embodiment of the disclosure. A difference between FIG. 1B and FIG. 1A is that the group of accounting nodes 100 does not include a generator node for generating transaction information. Transaction information generator nodes 104 are outside the group of accounting nodes 100, and each transaction information generator node 104 has a corresponding accounting node 101 in the group of accounting nodes 100. After generating transaction information that needs to be added onto the blockchain, the transaction information generator node 104 sends the transaction information to the corresponding accounting node 101, and the corresponding accounting node 101 sends the transaction information to the leader accounting node 102. A process of packaging and adding onto the blockchain by the leader accounting node is the same as that shown in FIG. 1A, and details are not described again.

In FIG. 1B, the transaction information generator nodes 104 have no accounting (adding a data block onto the blockchain) permission and cannot perform verification and witness on any accounting behavior of the accounting node 101. Therefore, the transaction information generator nodes 104 should completely trust the accounting node 101 as to recording of the transaction information onto the blockchain.

Figure 1C:
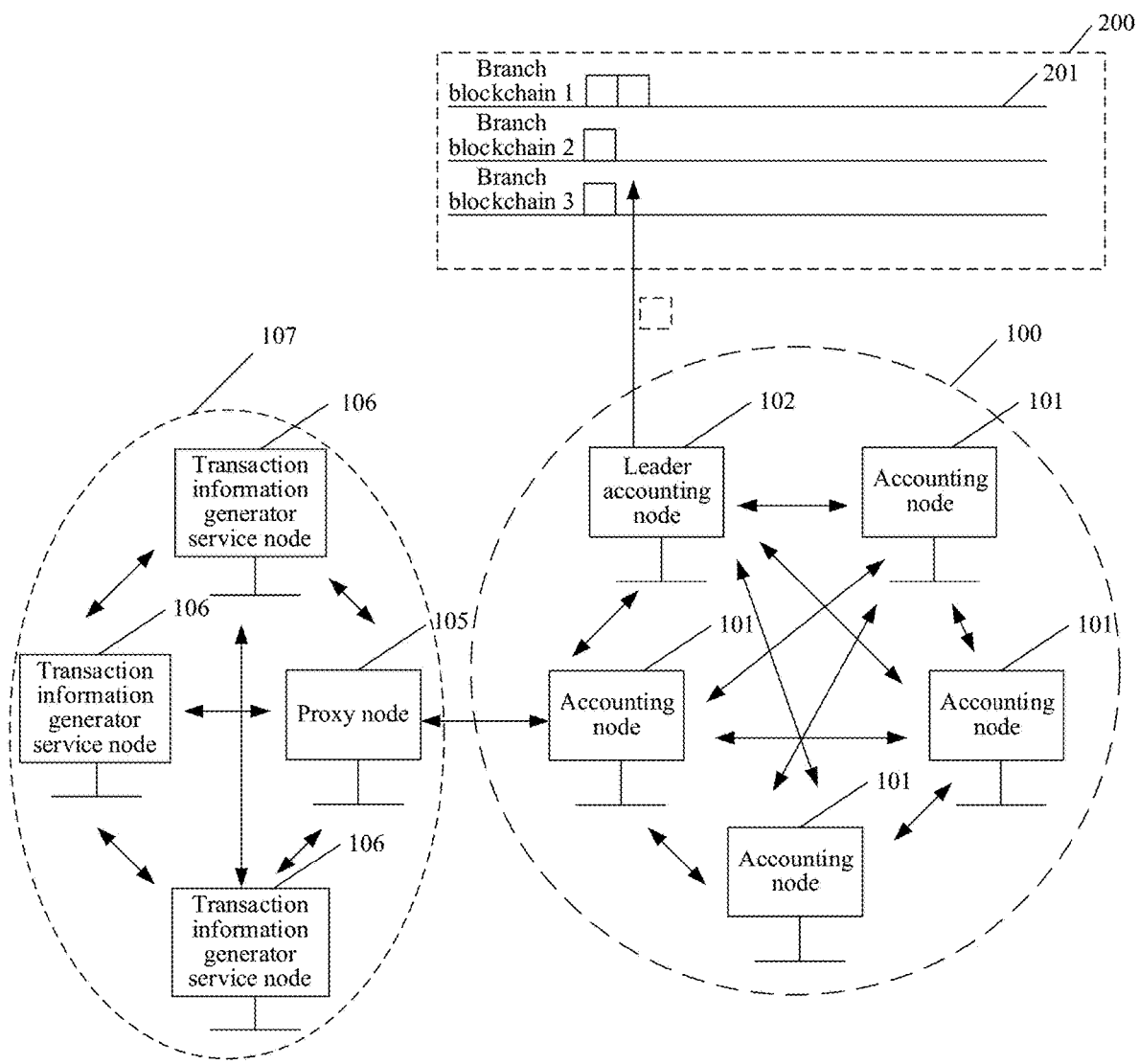

In FIG. 1C, transaction information generator service nodes 106 are also outside the group of accounting nodes 100. However, different from FIG. 1B, the transaction information generator service nodes 106 form a group of service nodes 107. Although the transaction information generator service nodes 106 in the group of service nodes 107 have no accounting (adding a data block onto the blockchain) permission, the transaction information generator service nodes may perform verification and witness on the accounting behavior of the accounting node 101.

Specifically, when the transaction information generator service nodes 106 have transaction information that needs to be added onto the blockchain, the transaction information generator service nodes 106 send the transaction information to a proxy node 105. The proxy node 105 is a node in the group of service nodes 107 dedicated to interfacing between the group of accounting nodes 100 and the group of service nodes 107. The proxy node 105 sends the transaction information to an accounting node 101 in the group of accounting nodes 100, and the accounting node 101 sends the transaction information to the leader accounting node 102. A process of packaging and adding onto the blockchain by the leader accounting node 102 is the same as that shown in FIG. 1A, and details are not described again.

When adding a data block onto the blockchain, the leader accounting node 102 adds a digest obtained by performing a digest operation on a block body of the data block and a signature obtained by encrypting the digest by using a private key of the leader accounting node 102 to a block header. After adding the data block onto the blockchain, the leader accounting node 102 sends the block header of the data block to the transaction information generator service nodes 106 through the proxy node 105. The transaction information generator service nodes 106 decrypt the signature by using a public key of the leader accounting node 102, to obtain a digest, and compare the digest with the digest included in the block header. If the two are consistent, signature verification is passed; otherwise, the signature verification fails, thereby preventing the behavior of cheating by all the accounting nodes 101 and performing verification on the accounting of the accounting node 101. Therefore, a difference between the system architecture in FIG. 1C and that in FIG. 1B is that the transaction information generator service nodes 106 may witness the accounting behavior of the accounting node 101 instead of passively trusting the accounting node 101.

FIG. 2A to FIG. 2E show interface diagrams of an execution process of a method for recording a data block on a blockchain in an application scenario in which an electronic invoice is added onto a blockchain.

A process of transferring an electronic invoice from one party to the other is considered as one transaction of the electronic invoice. Information related to a transaction is referred to as transaction information. A terminal of a tax office issues an electronic invoice to a terminal of an invoicing unit. After a transaction of issuance is performed on the electronic invoice, transaction information of issuing the electronic invoice needs to be written onto the blockchain. The terminal of the invoicing unit issues the electronic invoice to a terminal of a person requesting for reimbursement. After a transaction of invoice issuance is performed on the electronic invoice, transaction information of the invoice issuance needs to be written onto the blockchain. The terminal of the person requesting for reimbursement and a terminal of a reimbursement unit perform reimbursement settlement. After a transaction of reimbursement is performed on the electronic invoice, transaction information of the reimbursement needs to be written onto the blockchain. In these cases, all the transaction information needs to be added onto the blockchain.

After receiving transaction information that needs to be added into a target data block, the leader accounting node 102 does not immediately package the transaction information and add the transaction information onto the blockchain, but may package the transaction information into the target data block after the transaction information that needs to be added into the target data block reaches an enough size or has an enough quantity. When the transaction information that needs to be added into the target data block reaches the enough size, an interface shown in FIG. 2A appears in the leader accounting node 102, and an indication (e.g., message) such as, for example, "Current to-be-added-onto-blockchain electronic invoice transaction information has reached a packaging size, start packaging" is prompted.

Figure 2A:
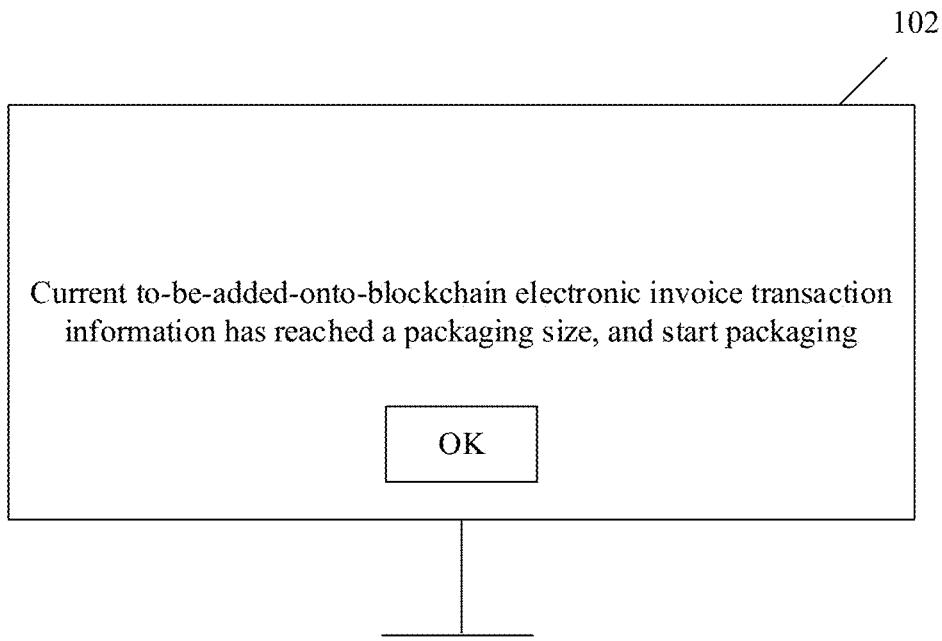
FIG. 2A to FIG. 2E show interface diagrams of an execution process of a method for recording a data block on a blockchain in an application scenario in which an electronic invoice is added onto a blockchain.

On the interface shown in FIG. 2A, if an administrator clicks "OK", a branch blockchain that needs to perform recording starts to be selected. A previous data block on the blockchain needs to be recorded on the branch blockchain 1, but a consensus has not been reached on the previous data block. If the target data block is also recorded on the branch blockchain 1, the consensus on the previous data block is waited for reaching, and a digest of the previous data block is recorded in the block header of the target data block, resulting in poor efficiency of the data block addition. Therefore, a branch blockchain such as the branch blockchain 2 may be selected from two branch blockchains, that is, the branch blockchains 2 and 3, for which a consensus has been reached on the lastest data blocks. A digest of the current lastest data block of the branch blockchain 2 may be directly recorded in the block header of the target data block, and the target data block is recorded on the branch blockchain 2. In this way, the problem of unlimited waiting time, which results from a situation where the consensus is not reached on the previous data block and the digest cannot be obtained to fill in a block body, is avoided. In this case, an indication such as, for example, "A previous data block on a blockchain is recorded on a branch blockchain 1, and a currently generated target data block is to be recorded on a branch blockchain 2" is prompted on an interface shown in FIG. 2B.

Figure 2B:
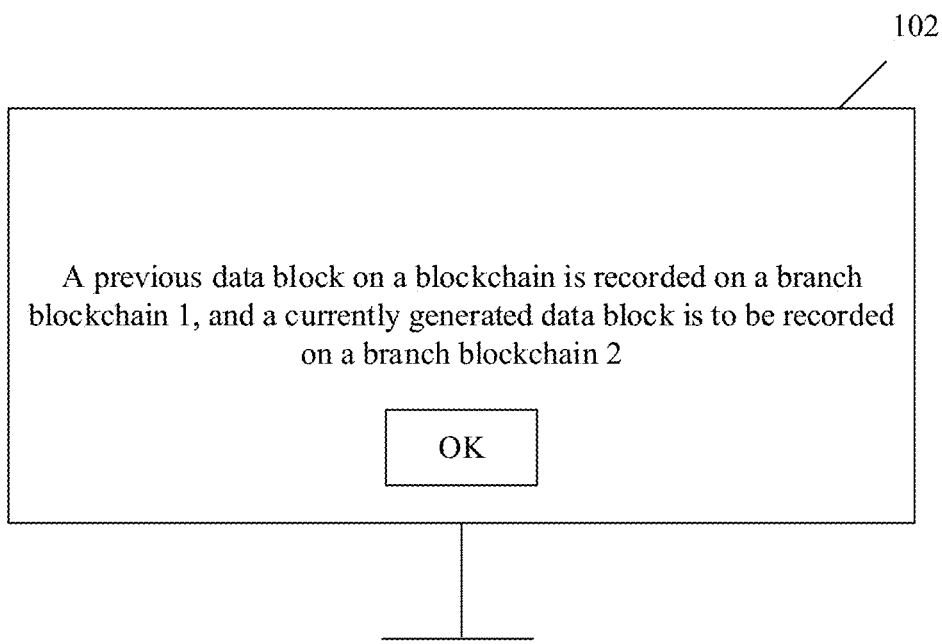
Figure 2C:
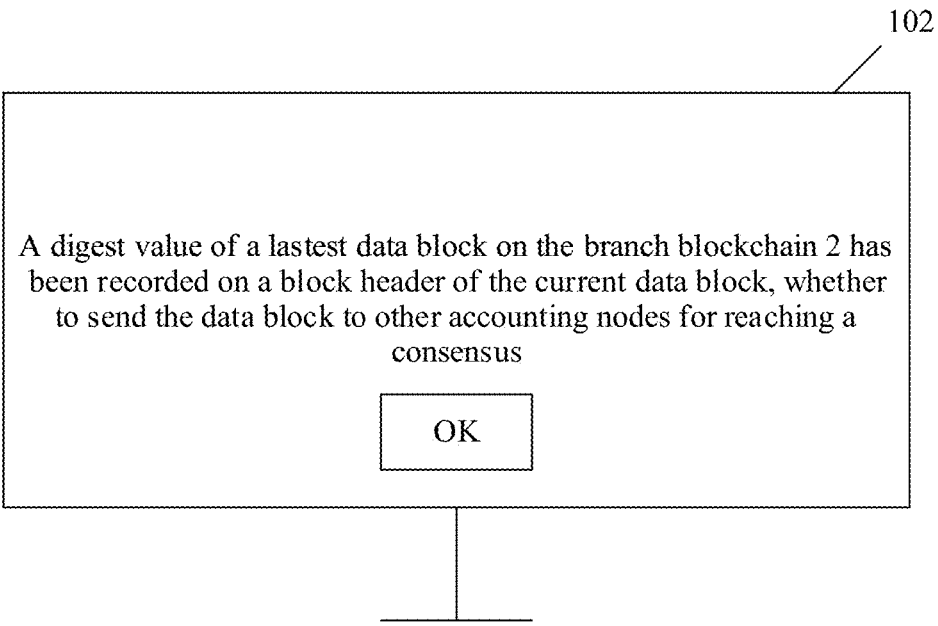

On the interface shown in FIG. 2B, if the administrator clicks "OK", an interface shown in FIG. 2C appears, and an indication such as, for example, "A digest value of a lastest data block on the branch blockchain 2 has been recorded in a block header of the target data block, whether to send the target data block to other accounting nodes for reaching a consensus" is prompted. If the administrator clicks "OK", the target data block is sent to the other accounting nodes for reaching the consensus, and the accounting node records the target data block on the blockchain.

Figure 2D:
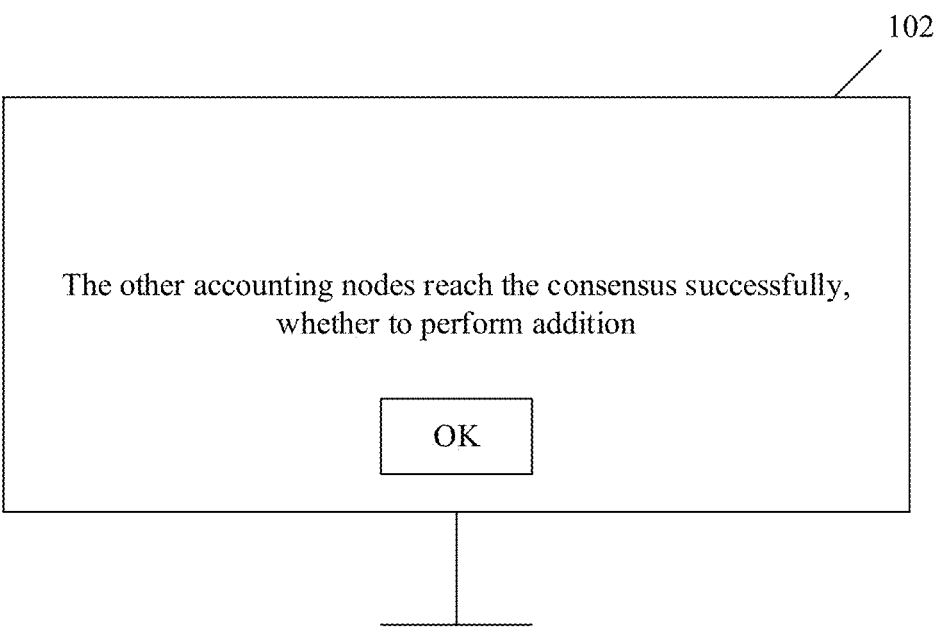

After the other accounting nodes reach the consensus successfully, an interface shown in FIG. 2D is displayed, and an indication such as, for example, "Other accounting nodes reach a consensus successfully, whether to perform addition" is prompted. If the administrator clicks "OK", the other accounting nodes record the target data block on the blockchain.

Figure 2E:
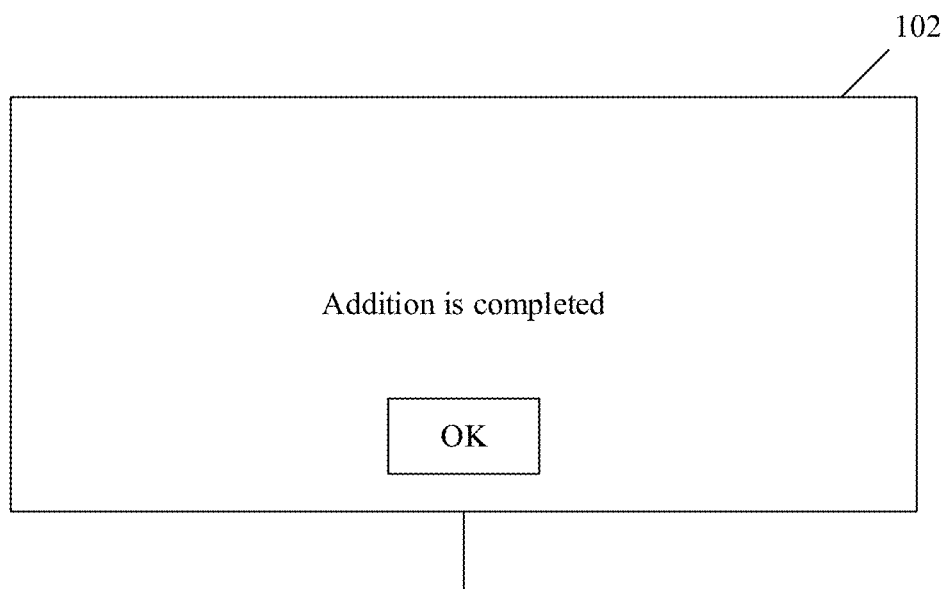

After the target data block is added onto the blockchain, an interface shown in FIG. 2E appears, and an indication such as, for example, "Addition is completed" is prompted.

A difference between recording a data block in a multi-branch blockchain structure according to an embodiment of the disclosure and recording a data block in an existing single blockchain structure is discussed below with reference to FIG. 3A and FIG. 3B below.

Figure 4A:
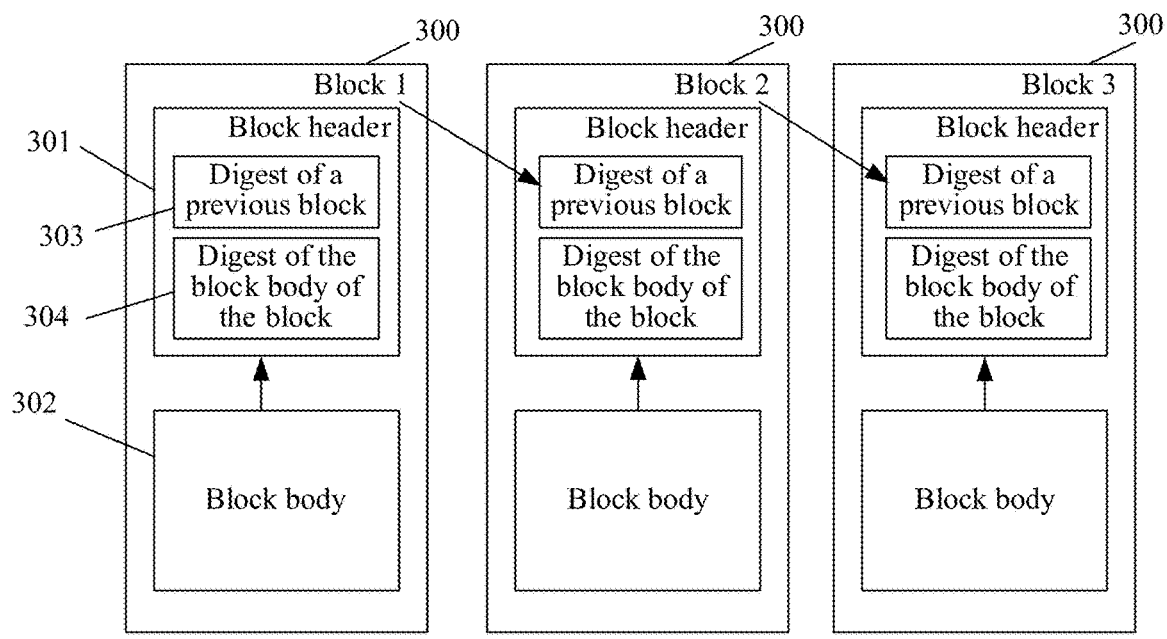
FIG. 4A shows a schematic diagram of a data structure of a block on a general blockchain.

As shown in FIG. 4A, a data structure of a data block includes a block header 301 and a block body 302. The block body 302 includes a part of all transaction information that is added onto the blockchain, which is essential content that is added onto the blockchain. The block header 301 carries a part of additional information (for example, identifier information) that is added onto the blockchain. The block header 302 needs to record at least two aspects of content, one is a digest of a block body of a target data block, and the other is a digest of a previous data block on a blockchain. The former is to form an identifier that uniquely represents the data block for the convenience of querying. The latter is to allow each block to include content related to a previous block, and at the same time, content of the each block is also associated with a next block to achieve the purpose of being unchangeable. If one block on the blockchain is tampered with privately, content in a block header of a previous block cannot match content in a block header of a latter block, which is easily found.

Figure 3A:
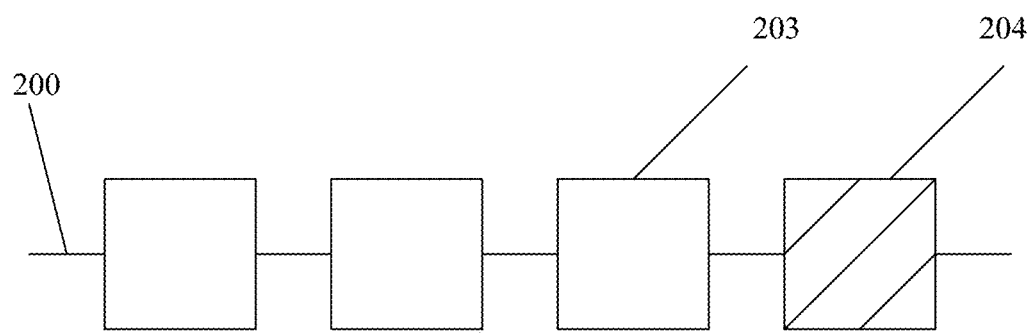
FIG. 3A shows a schematic diagram of recording a data block in a general single blockchain structure.

Therefore, as shown in FIG. 3A, in the existing single blockchain structure, a digest value of a previous data block needs to be filled in a block header of each data block, and before a consensus is reached on the previous data block, the target data block always has a field of which a value is not determined. Consequently, the target data block may be added onto the blockchain after the consensus has been reached on the previous data block. As shown in FIG. 3A, a data block 204 in a consensus may be added onto the blockchain after the previous data block becomes a data block 203 that has been added onto the blockchain (on which a consensus is reached).

Figure 3B:
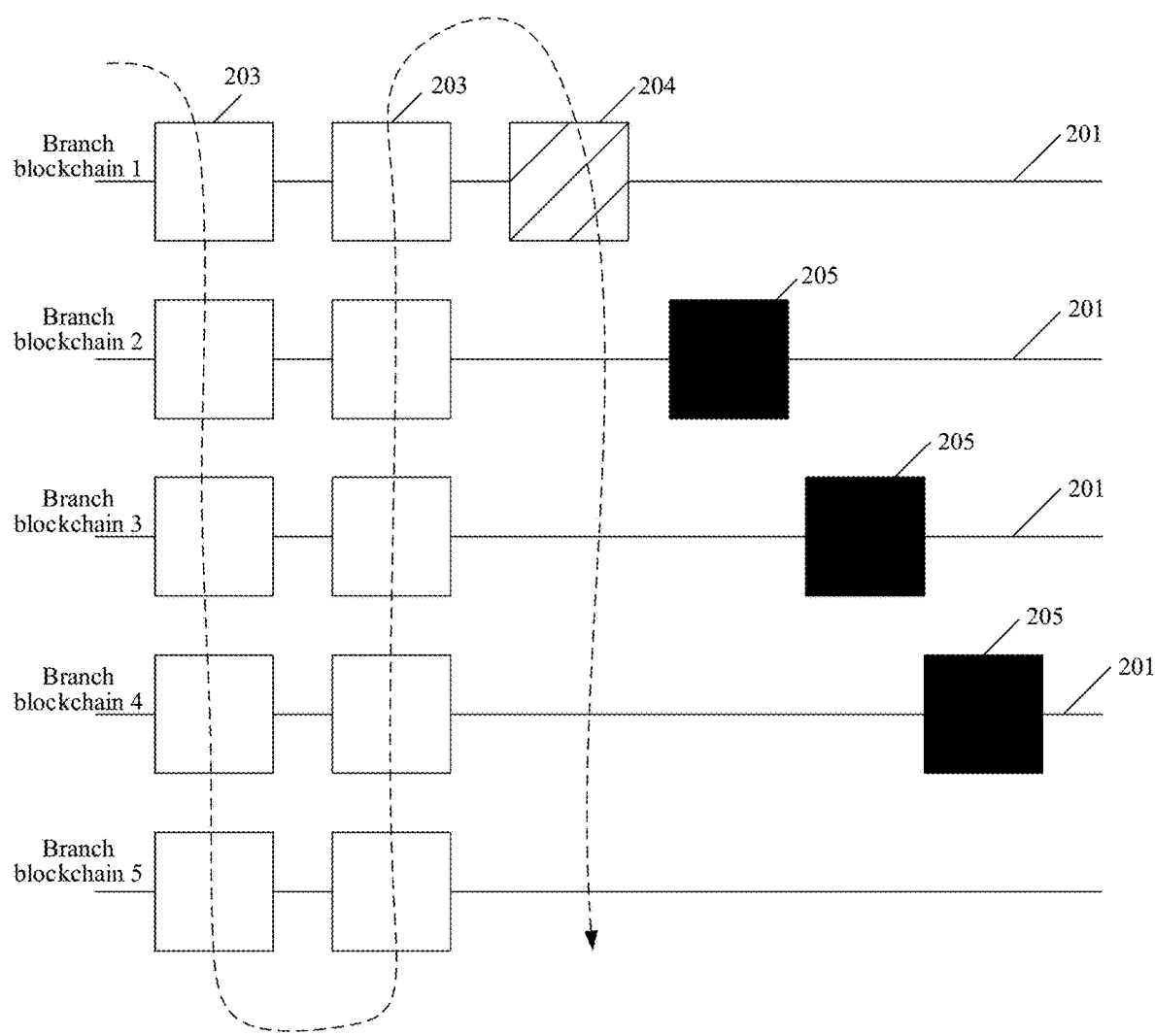
FIG. 3B is a schematic diagram of recording a data block in a multi-branch blockchain structure according to an embodiment of the disclosure.

In the embodiments of the disclosure, as shown in FIG. 3B, the blockchain is divided into a plurality of branch blockchains 1 to 5. A curve in FIG. 3B is an order in which each branch blockchain in the branch blockchains is selected for data block addition. When 10 data blocks 203 that have been added onto the blockchain have been recorded on the blockchain, a consensus is being reached on the data block 204, and the data block 204 is selected and recorded on the branch blockchain 1, a subsequent to-be-added-onto-blockchain data block 205 is not selected and recorded on the branch blockchain 1, but is successively selected and recorded on the branch blockchains 2, 3, 4, . . . in which no data block is in consensus. This is because if the data block 205 is selected and recorded on the branch blockchain 1, a digest of the data block 204 may be obtained after the consensus is reached on the data block 204, and the digest is recorded in a block header of the next to-be-added-onto-blockchain data block 205 for adding onto the blockchain, resulting in a long waiting time, and parallel processing cannot be performed, which causes low efficiency. According to an example embodiment of the disclosure, no such problem occurs because the to-be-added-onto-blockchain data block is successively selected and recorded on the branch blockchains 2, 3, and 4, a consensus has been reached on the current lastest data blocks on the branch blockchains, and digests of the current lastest data blocks on the branch blockchains may be written into a block header of a to-be-added-onto-blockchain data block. Therefore, the data block may be quickly recorded in the branch blockchain, thereby improving the efficiency of the data block addition.

Figure 9:
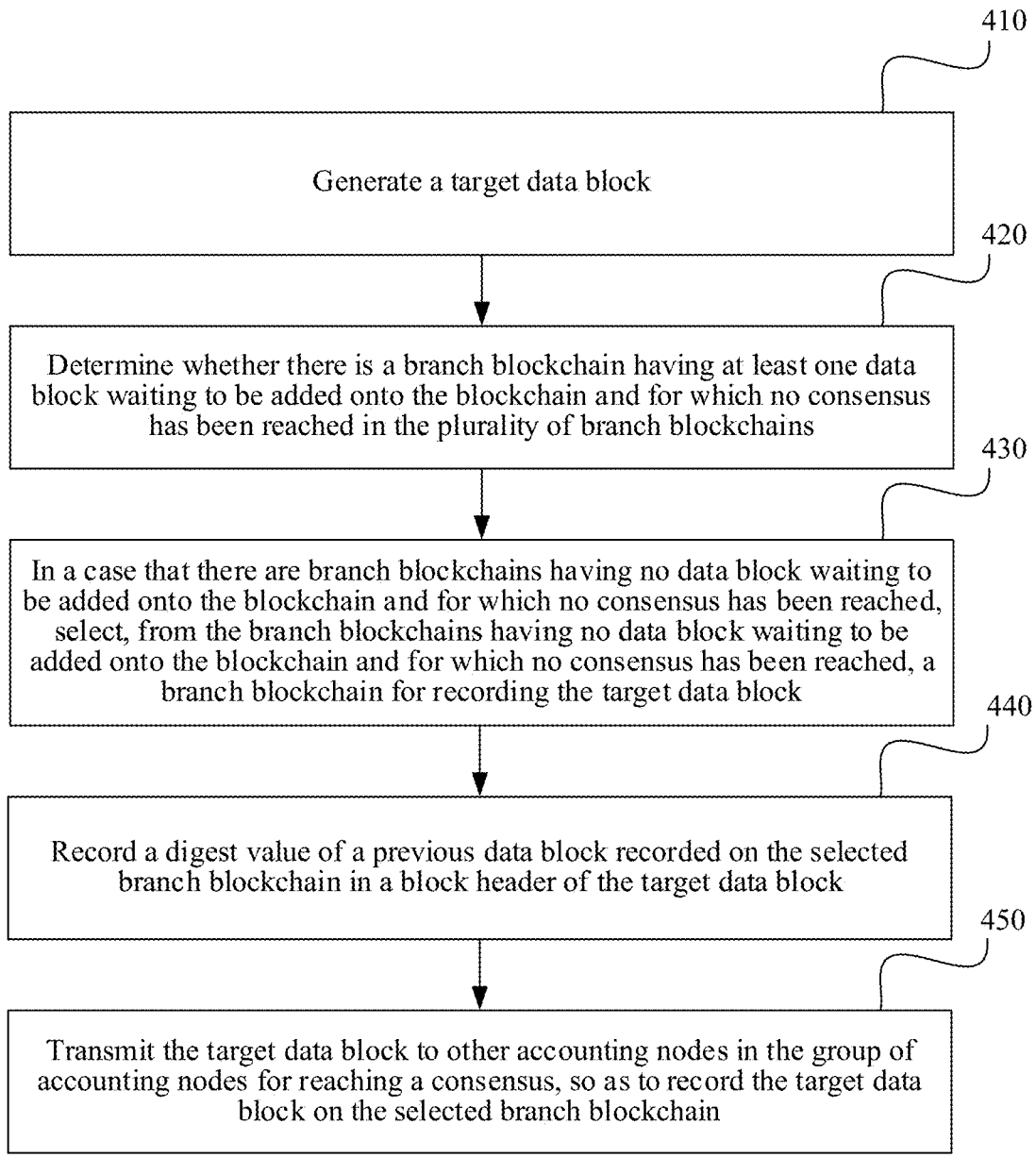
FIG. 9 shows a flowchart of a method for recording a data block on a blockchain according to an embodiment of the disclosure.

As shown in FIG. 9, according to an embodiment of the disclosure, a method for recording a data block on a blockchain is provided. The method may be performed by the leader accounting node 102 in FIG. 1A to FIG. 1C. The leader accounting node may be fixed, or may be selected periodically. A method for selecting the leader accounting node 102 is described in detail in the following.

In this embodiment, the blockchain includes a plurality of branch blockchains. The branch blockchain is a chain divided from the blockchain, on which recording of a data block is performed by the same group of accounting nodes, and occupying the same process. The same process refers to a process in which distribution of the branch blockchains is uniformly scheduled, and data blocks recorded on each branch blockchain are also recorded in a total scheduling order. This is in contrast to a concept of sub-blockchain. The sub-blockchain is a chain divided from the blockchain, on which recording of a data block is performed by different groups of accounting nodes, and occupying different processes. For example, sub-blockchains 1, 2, and 3 may respectively record data blocks of transactions of supply chain finance, electronic invoices, and legal digital currency, and the data blocks are added onto the blockchain by using an accounting node group 1, an accounting node group 2, and an accounting node group 3 that specifically record the data blocks of the supply chain finance, the electronic invoices, and the legal digital currency. An order in which each data block is added onto the blockchain by using each accounting node group is also independent of each other and does not affect each other. In contrast, branch blockchains 1, 2, and 3 perform recording by using the same group of accounting nodes, and an order in which data blocks are recorded on the branch blockchains 1, 2, and 3 is also affected by an order in which the data blocks are generated in the group of accounting nodes. The order in which the data blocks are recorded on the branch blockchains is not independent, and is controlled by an order in which the data blocks are generated in the entire blockchain.

As shown in FIG. 9, in this embodiment, the method includes the following operation 410-450.

Operation 410. Generate a target data block.

Operation 420. Determine whether there is a branch blockchain having at least one data block waiting to be added onto the blockchain and for which no consensus has been reached in the plurality of branch blockchains.

Operation 430. When there are branch blockchains having no data block waiting to be added onto the blockchain and for which no consensus has been reached, select, from the branch blockchains having no data block waiting to be added onto the blockchain and for which no consensus has been reached, a branch blockchain for recording the target data block.

Operation 440. Record a digest value of a previous data block recorded on the selected branch blockchain in a block header of the target data block.

Operation 450. Transmit the target data block to other accounting nodes in the group of accounting nodes for reaching a consensus, so as to record the target data block on the selected branch blockchain.

The following describes the operations in detail.

In operation 410, the target data block is generated.

The target data block is a data block including transaction information that needs to be added onto the blockchain and being added onto the blockchain currently. In an embodiment, after receiving transaction information that needs to be added into the target data block, the leader accounting node 102 does not immediately package the transaction information for addition, but may package the transaction information into the target data block after the transaction information that needs to be added into the target data block meets a preset condition, for example, reaches an enough size or has an enough quantity.

In operation 420, it is determined whether there is a branch blockchain having at least one data block waiting to be added onto the blockchain and for which no consensus has been reached in the plurality of branch blockchains.

Data blocks that need to be added onto the blockchain in the group of accounting nodes are added onto the blockchain by using the leader accounting node. Therefore, the leader accounting node is very clear about, in the branch blockchains, which branch blockchains for which consensus has not been reached on data block and which branch blockchains for which consensus has been reached on all data blocks. In an embodiment, a consensus flag bit may be set for each branch blockchain in the leader accounting node. Each time a data block is generated and a branch blockchain to which the data block is recorded is selected, a consensus flag bit corresponding to the branch blockchain is 1. Once a consensus is reached on the branch blockchain, a consensus flag bit corresponding to the branch blockchain is 0. In this way, those branch blockchains with consensus flag bits being 0 are branch blockchains having no data block waiting to be added onto the blockchain and for which no consensus has been reached.

In operation 430, when there are the branch blockchains having no data block waiting to be added onto the blockchain and for which no consensus has been reached, a branch blockchain is selected from the branch blockchains having no data block waiting to be added onto the blockchain and for which no consensus has been reached for recording the target data block.

A manner of selecting the branch blockchain for recording the target data block may be such that selection is performed according to an order of sequence numbers in the branch blockchains having no data block waiting to be added onto the blockchain and for which no consensus has been reached.

In this embodiment, the selecting, from the branch blockchains having no data block waiting to be added onto the blockchain and for which no consensus has been reached, a branch blockchain for recording the target data block includes:

determining first branch blockchains from the branch blockchains having no data block waiting to be added onto the blockchain and for which no consensus has been reached, sequence numbers of the first branch blockchains being greater than a sequence number of a second branch blockchain, the second branch blockchain being a branch blockchain recording the previous data block of the target data block;

selecting a branch blockchain with the smallest sequence number from the first branch blockchains as the branch blockchain for recording the target data block; and when none of the branch blockchains having no data block waiting to be added onto the blockchain and for which no consensus has been reached has a sequence number greater than the sequence number of the second branch blockchain, selecting, from the branch blockchains having no data block waiting to be added onto the blockchain and for which no consensus has been reached, a branch blockchain with the smallest sequence number as the branch blockchain for recording the target data block.

Branch blockchains of which sequence numbers are greater than a sequence number of a branch blockchain to which a previous data block in the blockchain is recorded are selected from the branch blockchains having no data block waiting to be added onto the blockchain and for which no consensus has been reached, to ensure that selection is performed in ascending order of sequence numbers. A branch blockchain with the smallest sequence number is selected from first branch blockchains of which sequence numbers are greater than a sequence number of a branch blockchain (that is, a second branch blockchain) to which a previous data block in the blockchain is recorded as the branch blockchain for recording the target data block, to ensure that there is no omission in the middle. For example, there are five branch blockchains with sequence numbers being 1 to 5, but only the branch blockchains with the sequence numbers being 1, 3, and 5 are the branch blockchains for which consensus has been reached on data blocks. A previous data block is added to the branch blockchain 2, and in this case, selection is to be performed in the branch blockchains 3 and 5 of which the sequence numbers are greater than the sequence number 2. Because the sequence number 3 is relatively small, the branch blockchain 3 is selected for addition.

In addition, there is also a circular mechanism to ensure that when a branch blockchain with a very large sequence number is selected, and no branch blockchain for which consensus has been reached on all the data blocks has a sequence number greater than the sequence number of the branch blockchain, a branch blockchain with the smallest sequence number may be returned to start to check. Therefore, no branch blockchain for which consensus has been reached on all the data blocks has a sequence number is greater than a sequence number of a branch blockchain (that is, a second branch blockchain) to which a previous data block is added, a branch blockchain with the smallest sequence number is selected from the branch blockchains having no data block waiting to be added onto the blockchain and for which no consensus has been reached as the branch blockchain for recording the target data block, that is, the blockchain with the smallest sequence number is returned for reselection. For example, there are five branch blockchains with sequence numbers being 1 to 5, but only the branch blockchains with the sequence numbers being 1 to 3 are the branch blockchains for which consensus has been reached on data blocks. A previous data block is added onto the branch blockchain 4, and no branch blockchain for which consensus has been reached on all the data blocks has a sequence number greater than 4. Therefore, the sequence number 1 is to be returned, and the branch blockchain 1 is selected for addition.

This embodiment has the advantage of convenient and easy operation in a polling manner of sequence numbers, and low in operation costs.

A manner of selecting the branch blockchain for recording the target data block may be such that, according to a principle of balancing a quantity of data blocks on each branch blockchain, the target data block is allocated to a branch blockchain that records the fewest data block currently. In this embodiment, the selecting, from the branch blockchains having no data block waiting to be added onto the blockchain and for which no consensus has been reached, a branch blockchain for recording the target data block includes:

determining a quantity of recorded data blocks on each of the branch blockchains having no data block waiting to be added onto the blockchain and for which no consensus has been reached;

A branch blockchain with the smallest quantity of recorded data blocks is selected as the branch blockchain for recording the target data block.

In an embodiment, a quantity of recorded data blocks on each of the branch blockchains having no data block waiting to be added onto the blockchain and for which no consensus has been reached may be determined by querying a block height of a lastest data block of each branch blockchain having no data block waiting to be added onto the blockchain and for which no consensus has been reached. The block height refers to a sequence number of a block on the branch blockchain in an order of recording time. On a branch blockchain, a height of the first data block is recorded as 1, a height of the second data block is recorded as 2, and so on. In this way, the block height represents a quantity of recorded data blocks on the branch blockchain.

This embodiment has the advantages of helping balancing a quantity of data blocks of a branch blockchain and improving reasonable use of resources.

Another manner of selecting the branch blockchain for recording the target data block may be such that according to a recording principle such as time equalization or the like on each branch blockchain, the target data block is allocated to a branch blockchain having a determined maximum difference between a recording time of a current lastest data block on each of the branch blockchains having no data block waiting to be added onto the blockchain and for which no consensus has been reached and current data. In this embodiment, the selecting, from the branch blockchains having no data block waiting to be added onto the blockchain and for which no consensus has been reached, a branch blockchain for recording the target data block includes:

determining a time difference between a recording time of a current lastest data block on each of the branch blockchains having no data block waiting to be added onto the blockchain and for which no consensus has been reached and a current time.

For example, a branch blockchain with the maximum time difference may be selected as the branch blockchain for recording the target data block.

The leader accounting node may maintain a correspondence list between a data block identifier and a recording time. The correspondence list may be searched according to identifiers of current lastest data blocks on the branch blockchains having no data block waiting to be added onto the blockchain and for which no consensus has been reached, to obtain recording times of the current lastest data blocks on the branch blockchains having no data block waiting to be added onto the blockchain and for which no consensus has been reached.

The advantage of selecting another branch blockchain with a maximum difference between a recording time of the lastest recorded data block and the current time as the branch blockchain for recording the target data block is that data blocks of which addition times are close are distributed to different branch blockchains, and the branch blockchains store data blocks of which addition times are dispersed, so that the branch blockchains maintain load balance in the aspect of the addition times of the data blocks.

Figure 10:
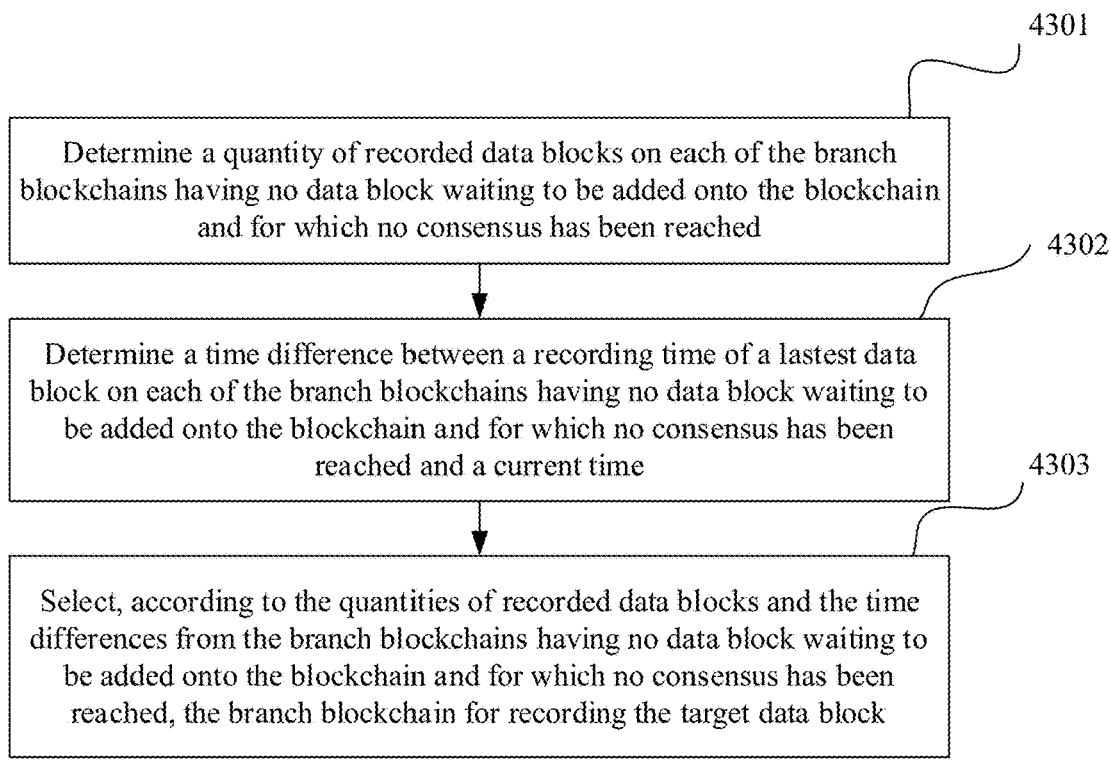
FIG. 10 shows a flowchart of a specific process of operation 430 according to an embodiment of the disclosure.

In another embodiment, as shown in FIG. 10, the selecting, from the branch blockchains having no data block waiting to be added onto the blockchain and for which no consensus has been reached, a branch blockchain for recording the target data block includes the following operations.

Operation 4301. Determine a quantity of recorded data blocks on each of the branch blockchains having no data block waiting to be added onto the blockchain and for which no consensus has been reached.

Operation 4302. Determine a time difference between a recording time of a lastest data block on each of the branch blockchains having no data block waiting to be added onto the blockchain and for which no consensus has been reached and a current time.

Operation 4303. Select, according to the quantities of recorded data blocks and the time differences from the branch blockchains having no data block waiting to be added onto the blockchain and for which no consensus has been reached, the branch blockchain for recording the target data block.

Compared with the embodiment in which the branch blockchain for recording the target data block is determined by only considering a quantity of recorded data blocks on each of the branch blockchains or a difference between a recording time in a block header of a lastest recorded data block and a current time, in this embodiment, the branch blockchain for recording the target data block is determined not only by considering balance of a quantity of data blocks on each branch blockchain, but also by considering balance of data blocks that are added onto the blockchain at different times on the branch blockchains, which is beneficial to entire load balance of the data blocks on the branch blockchains and improving the cooperative utilization of resources.

Figure 11:
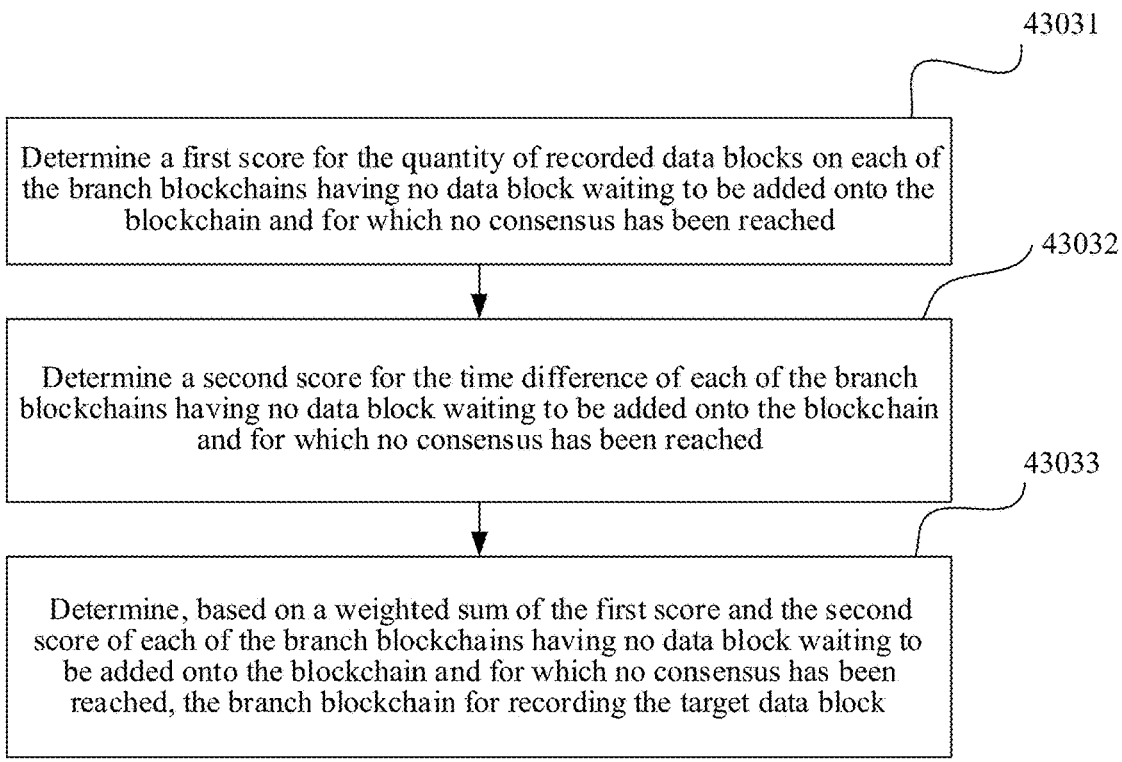
FIG. 11 shows a flowchart of a specific process of operation 4303 according to an embodiment of the disclosure.

As shown in FIG. 11, in an embodiment, operation 4303 includes the following operations.

Operation 43031. Determine a first score for the quantity of recorded data blocks on each of the branch blockchains having no data block waiting to be added onto the blockchain and for which no consensus has been reached.

Operation 43032. Determine a second score for the time difference of each of the branch blockchains having no data block waiting to be added onto the blockchain and for which no consensus has been reached.

Operation 43033. Determine, based on a weighted sum of the first score and the second score of each of the branch blockchains having no data block waiting to be added onto the blockchain and for which no consensus has been reached, the branch blockchain for recording the target data block.

In this embodiment, a quantity of recorded data blocks on each of the branch blockchains or a difference between a recording time in a block header of a lastest recorded data block and a current time is scored, and the branch blockchain for recording the target data block is comprehensively determined by using a value of a score. The advantage of this operation is that, the branch blockchain for recording the target data block is selected by using a more quantitative method, to improve the accuracy of selection of the branch blockchain.

In an embodiment, operation 43031 may be implemented by using a formula. Since a smaller quantity of recorded data blocks on a branch blockchain indicates that the branch blockchain is increasingly expected to be determined as the branch blockchain for recording the target data block, a higher first score may be set for the smaller quantity of recorded data blocks of the branch blockchain. For example, the following formula may be set.

$$S1 = a1/(1+P) \quad \text{formula 1}$$

where S1 represents the first score, a1 is a constant preset based on experience, and P is the quantity of recorded data blocks on the branch blockchain. The reason for adding 1 to a denominator is to prevent the denominator from being equal to 0 when there is no data block in a branch blockchain for addition. The first score may be calculated through formula 1 for each of the branch blockchains having no data block waiting to be added onto the blockchain and for which no consensus has been reached. However, formula 1 is merely an example and any other formula may be used as long as it assigns a higher first score to a smaller quantity of recorded data blocks on a branch blockchain.

The advantage of calculating the first score by using the formula is that the accuracy of selection of the branch blockchain is improved.

In another embodiment, operation 43031 may be implemented by searching a preset correspondence table between the quantity of recorded data blocks on the branch blockchain and the first score. The following is an example of the correspondence table.

TABLE 1

Correspondence table between a quantity of recorded data blocks on a branch blockchain and a first score

| A quantity of recorded data blocks | First score |
|---|---|
| 0-1 | 1 |
| 2-4 | 0.8 |
| 5-9 | 0.6 |
| 10-19 | 0.4 |
| 20-49 | 0.2 |
| More than 50 | 0 |

In this way, the first score for the branch blockchain may be obtained by searching the correspondence table between the quantity of recorded data blocks on the branch blockchain and the first score. Table 1 is merely an example and any other preset correspondence table between the quantity of recorded data blocks on the branch blockchain and the first score may be determined depending on an embodiment.

The first score determination by using table lookup has advantages of being simple and easy to operate.

In an embodiment, operation 43032 may be implemented by using a formula. Since a larger difference between a recording time in a block header of a lastest recorded data block and a current time indicates that the branch blockchain is increasingly expected to be determined as the branch blockchain for recording the target data block, a higher second score may be set for the larger difference between the recording time in the block header of the lastest recorded data block and the current time. For example, the following formula may be set.

$$S2 = a2 \times \Delta T \quad \text{formula 2}$$

where S2 represents the second score, a2 is a constant preset based on experience, and $\Delta T$ is the difference between the recording time in the block header of the lastest recorded data block and the current time. The second score may be calculated through formula 2 for the branch blockchains having no data block waiting to be added onto the blockchain and for which no consensus has been reached. However, formula 2 is merely an example and any other formula may be used as long as it assigns a higher second score to a larger time difference.

In another embodiment, operation 43032 may be implemented by searching a preset correspondence table between the time difference between the recording time in the block header of the lastest recorded data block and the current time and the second score. The following is an example of the correspondence table.

TABLE 2

Correspondence table between a time difference between a recording time in a block header of a lastest recorded data block and a current time and a second score

| Time difference between a recording time in a block header of a lastest recorded data block and a current time. | Second score |
|---|---|
| Above 5s | 1 |
| 4-5s | 0.8 |
| 3-4s | 0.6 |
| 2-3s | 0.4 |
| 1-2s | 0.2 |
| 0-1s | 0 |

Table 2 is merely an example and any other preset correspondence table between the recording time in the block header of the lastest recorded data block and the current time and the second score may be determined depending on an embodiment.

In operation 43033, the branch blockchain for recording the target data block is determined based on the weighted sum of the first score and the second score of each of the branch blockchains having no data block waiting to be added onto the blockchain and for which no consensus has been reached.

The advantage of this embodiment is that different weights are assigned to the first score and the second score, which fully considers different contribution of the quantity of recorded data blocks on the branch blockchain and the difference between the recording time in the block header of the lastest recorded data block and the current time on selection of the branch blockchain, thereby improving the accuracy of determining the branch blockchain.

During specific implementation, a branch blockchain with the largest weighted sum of the first score and the second score may be determined as the branch blockchain for recording the target data block. Alternatively, any one branch blockchain may be selected from all branch blockchains of which weighted sums or weighted average values of first scores and second scores exceed a predetermined weighted sum threshold, and the branch blockchain is determined as the branch blockchain for recording the target data block.

In operation 440, the digest value of the previous data block recorded on the selected branch blockchain is recorded in the block header of the target data block.

The previous data block recorded on the selected branch blockchain refers to a lastest data block currently recorded on the selected branch blockchain. The lastest data block is a data block that has been added onto the blockchain, and the digest value of the lastest data block may be immediately placed in the block header of the target data block for addition without waiting, thereby improving efficiency of the addition.

In an embodiment, as shown in FIG. 4A, the block header further includes a digest value of a block body of the target data block. The block body includes all transaction information in the target data block. The function of the digest value is to uniquely represent the data block because content of the block body is different and a digest value is different. During a query, the data block may be queried according to the digest value.

In this embodiment, operation 440 includes:

calculating a digest value of a block body of the target data block according to a predetermined digest algorithm; and recording the digest value of the block body of the target data block and the digest value of the previous data block recorded on the selected branch blockchain in the block header of the target data block.

In operation 450, the target data block is transmitted to the other accounting nodes in the group of accounting nodes for reaching the consensus, so as to record the target data block on the selected branch blockchain.

As shown in FIG. 3B, recording the target data block on the selected branch blockchain indicates that the target data block is recorded behind the previous data block on the selected branch blockchain, and the digest value of the previous data block is recorded in the block header of the target data block. A digest value of the target data block is recorded in a block header of a next to-be-recorded data block of the target data block on the branch blockchain, to form a chain that is mutually verified and cannot be tampered with. A block height of the branch blockchain is increased by 1.

In an embodiment, each branch blockchain has an identifier. The identifiers of the branch blockchains are different from each other. Operation 450 includes: recording the digest value of the previous data block recorded on the selected branch blockchain and the identifier of the selected branch blockchain in the block header of the target data block.

Figure 4B:
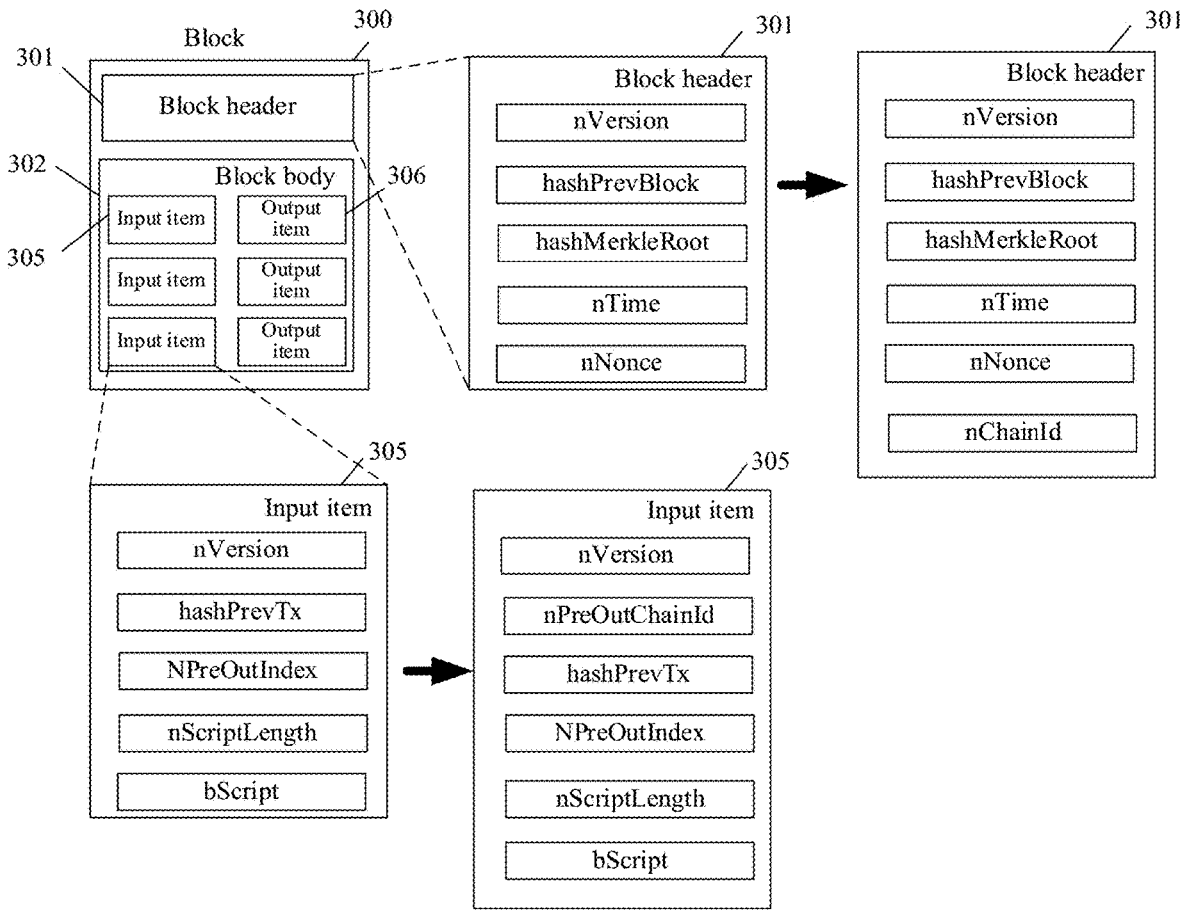
FIG. 4B is a schematic diagram of a data structure of a block header according to an embodiment of the disclosure.

In fact, as shown in FIG. 4B, the block header may not only include the digest value (hashPrevBlock) of the previous data block recorded on the selected branch blockchain and the identifier (nChinaId) of the selected branch blockchain, but also include a digest value (which is specifically a Merkle tree root in FIG. 4B, that is, one type of digest value, hashMerkleRoot) of a block body of the target data block, a blockchain version number (nVersion), a recording time (that is, an addition time, nTime) on the blockchain, and a blockchain special mark (nNonce).

In FIG. 4B, an existing block header only includes the blockchain version number (nVersion), the digest value (hashPrevBlock) of the previous data block recorded on the branch blockchain, the digest value (HashMerkleRoot) of the block body of the target data block, the recording time (that is, the addition time, nTime) on the blockchain, and the blockchain special mark (nNonce). In the embodiments of the disclosure, an identifier (nChinaId) of a branch blockchain is added to the block header. However, a person skilled in the art would understand that the blockchain version number (nVersion), the recording time (nTime) on the blockchain, and the blockchain special mark (nNonce) are optional. In an embodiment, the block header may not include the above (nVersion, nTime, nNonce) completely. In another embodiment, the block header may include one or more of the above. In another embodiment, the block header may also include other fields in addition to the above fields.

The blockchain version number (nVersion) represents a version number of a blockchain system. For example, a blockchain system that records electronic invoice information may be upgraded from a first-generation system to a second-generation system. A networking method of the blockchain system and a data structure of data blocks on the blockchain may change after being upgraded. The blockchain version number is identified in the block header, which helps to identify that the data block is added onto the blockchain under which blockchain system version.

The recording time (nTime) on the blockchain is a time at which a data block is recorded on the blockchain. The leader accounting node may write a current time into the recording time field when the target data block is added onto the blockchain, and then add the target data block onto the blockchain.

The blockchain special mark (nNonce) is a field often used to identify bitcoin transactions.

Figure 12:
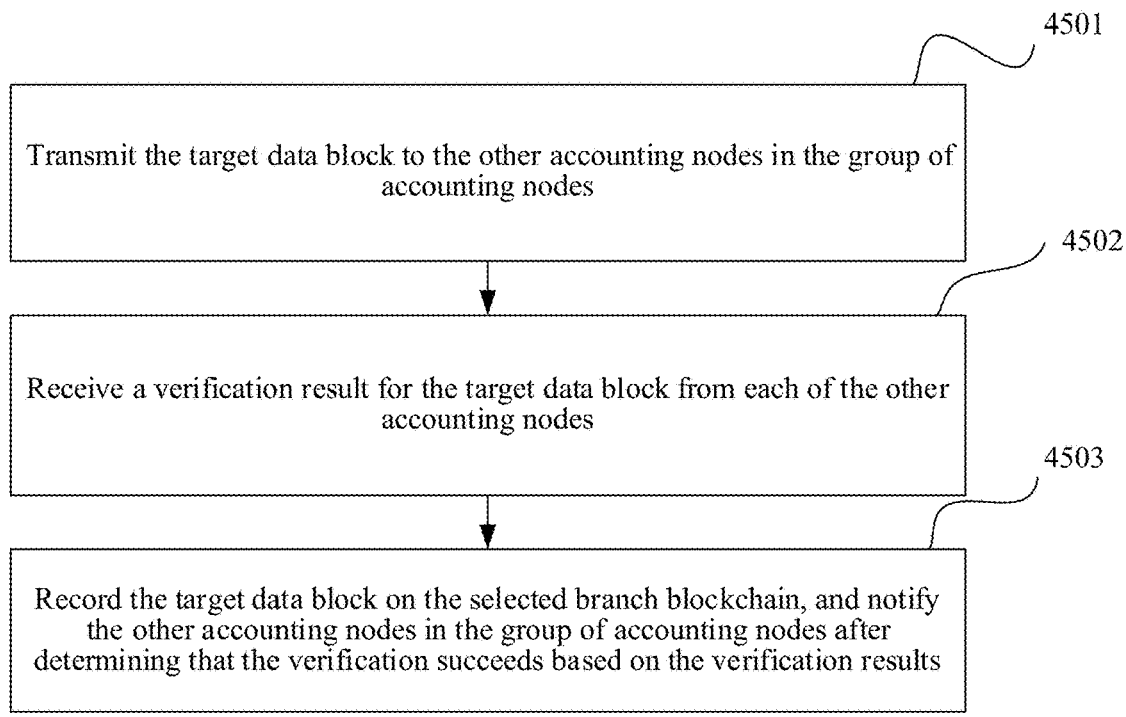
FIG. 12 shows a flowchart of a specific process of operation 450 according to an embodiment of the disclosure.

The block header contains the identifier of the branch blockchain, so that a data block may be conveniently recorded in the branch blockchain corresponding to the identifier according to the identifier during addition. In an embodiment, as shown in FIG. 12, operation 450 includes the following operations.

Operation 4501. Transmit the target data block to the other accounting nodes in the group of accounting nodes.

Operation 4502. Receive a verification result for the target data block from each of the other accounting nodes.

Operation 4503. Record the target data block on the selected branch blockchain, and notify the other accounting nodes in the group of accounting nodes after determining that the verification succeeds based on the verification results, so that the other accounting nodes record the target data block on the selected branch blockchain according to the identifier of the branch blockchain in the block header.

The following describes operation 4501 to operation 4503 in detail.

In operation 4501, the target data block is transmitted to the other accounting nodes in the group of accounting nodes, so that the other accounting nodes in the group of accounting nodes perform verification on the target data block to reach a consensus.

In operation 4502, the verification result for the target data block from each of the other accounting nodes is received.

The verification on the target data block by the other accounting nodes includes output item consumption verification, data block signature verification, transaction information signature verification, or the like.

The following first discusses the output item consumption verification.

In an embodiment, each piece of transaction information in a block body includes an input item and an output item. A transaction may be understood as a process in which some existing information is inputted into a transaction information generator node, and the transaction information generator node processes the inputted information to generate and output transaction result information. The information inputted to the transaction information generator node is referred to as the input item, and the transaction result information outputted by the transaction information generator node is referred to as the output item.

For example, in an electronic invoice application scenario, when a terminal of a tax office issues an electronic invoice to a terminal of an invoicing unit, issuer information (for example, name and address of the tax office) inputted by the terminal of the tax office is an input item, and as a result of the issuance of the electronic invoice, a series of electronic invoice identifiers (for example, a number of the electronic invoice) and terminal information (name of the invoicing unit, a taxpayer identification number, and the like) of the invoicing unit filled in the electronic invoice are output items. When the terminal of the invoicing unit issues an electronic invoice to a terminal of a person requesting for reimbursement, electronic invoice information (for example, an identifier of the issued electronic invoice) inputted on the terminal of the invoicing unit is an input item, and as a result of issuing the electronic invoice, name and contact information of the person requesting for reimbursement filled in the electronic invoice are output items. When the terminal of the person requesting for reimbursement reimburses a terminal of a reimbursement unit, the name and the contact information of the person requesting for reimbursement inputted on the terminal of the reimbursement unit are input items, and as a result of the reimbursement, name of the reimbursement unit, a taxpayer identification number, and the like are output items. It may be seen that the input item and the output item are relative.

It may be seen from the above that an input item in one piece of transaction information may be an output item in another piece of transaction information. For example, an input item of transaction information of issuing an electronic invoice is an output item of transaction information of issuing the electronic invoice, and an input item of transaction information of reimbursing the electronic invoice is an output item of transaction information of issuing the electronic invoice. Therefore, the input item is generally linked to an output item of transaction information in another data block recorded on the blockchain earlier than the target data block. For example, the target data block is an input item of a data block in which the transaction information of reimbursing the electronic invoice is located, and the input item is linked to an output item of a data block in which the transaction information of issuing the electronic invoice is located. The link indicates that when an input item of one piece of transaction information is an output item of another piece of transaction information, the input item is represented by the output item of the another piece of transaction information, so as to clearly indicate a relationship between the transaction information of the data blocks.

In an embodiment, the input item includes: a branch blockchain identifier (nPreOutChinaId) to which the input item is linked, a digest value (hashPrevTx) of a data block to which the input item is linked, and an index (NPreOutIndex) of transaction information to which the input item is linked in the data block.

As shown in FIG. 4B, an input item of transaction information in an existing block body may include 5 fields, which are respectively the blockchain version number (nVersion), the digest value (hashPrevTx) of the data block to which the input item is linked, the index (NPreOutIndex), a script length (nScriptLength), and a script (bScript) of the transaction information to which the input item is linked in the data block. The digest value (hashPrevTx) of the data block to which the input item is linked identifies which data block to which the input item is linked and that is previously recorded on the blockchain. The index (NPreOutIndex) of the transaction information to which the input item is linked in the data block identifies which transaction information to which the input item is linked in the data block. Through the digest value (hashPrevTx) of the data block to which the input item is linked, and the index (NPreOutIndex) of the transaction information to which the input item is linked in the data block, a location of previously recorded transaction information on the blockchain to which the input item is linked on a single blockchain is uniquely limited. However, when there are a plurality of branch blockchains, another field is required in the input item, that is, the branch blockchain identifier (nPreOutChinaId) to which the input item is linked. A branch blockchain to which the input item is linked is found first through the branch blockchain identifier (nPreOutChinaId) to which the input item is linked. After the branch blockchain is found, a previous data block to which the input item is linked is found through the digest value (hashPrevTx) of the data block to which the input item is linked. After the data block is found, transaction information to which the input item is linked is found through the index (NPreOutIndex) of the transaction information to which the input item is linked in the data block, so as to implement accurate positioning of the previously recorded transaction information to which the input item is linked in a multi-branch blockchain structure.

Figure 5A:
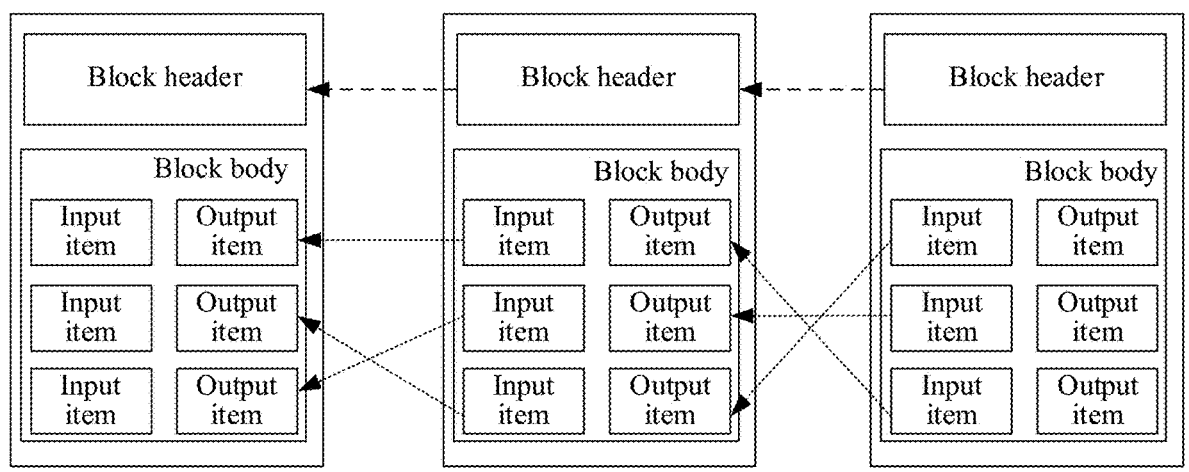
FIG. 5A shows a link relationship between an input item and an output item of transaction information in a general block data structure.
Figure 5B:
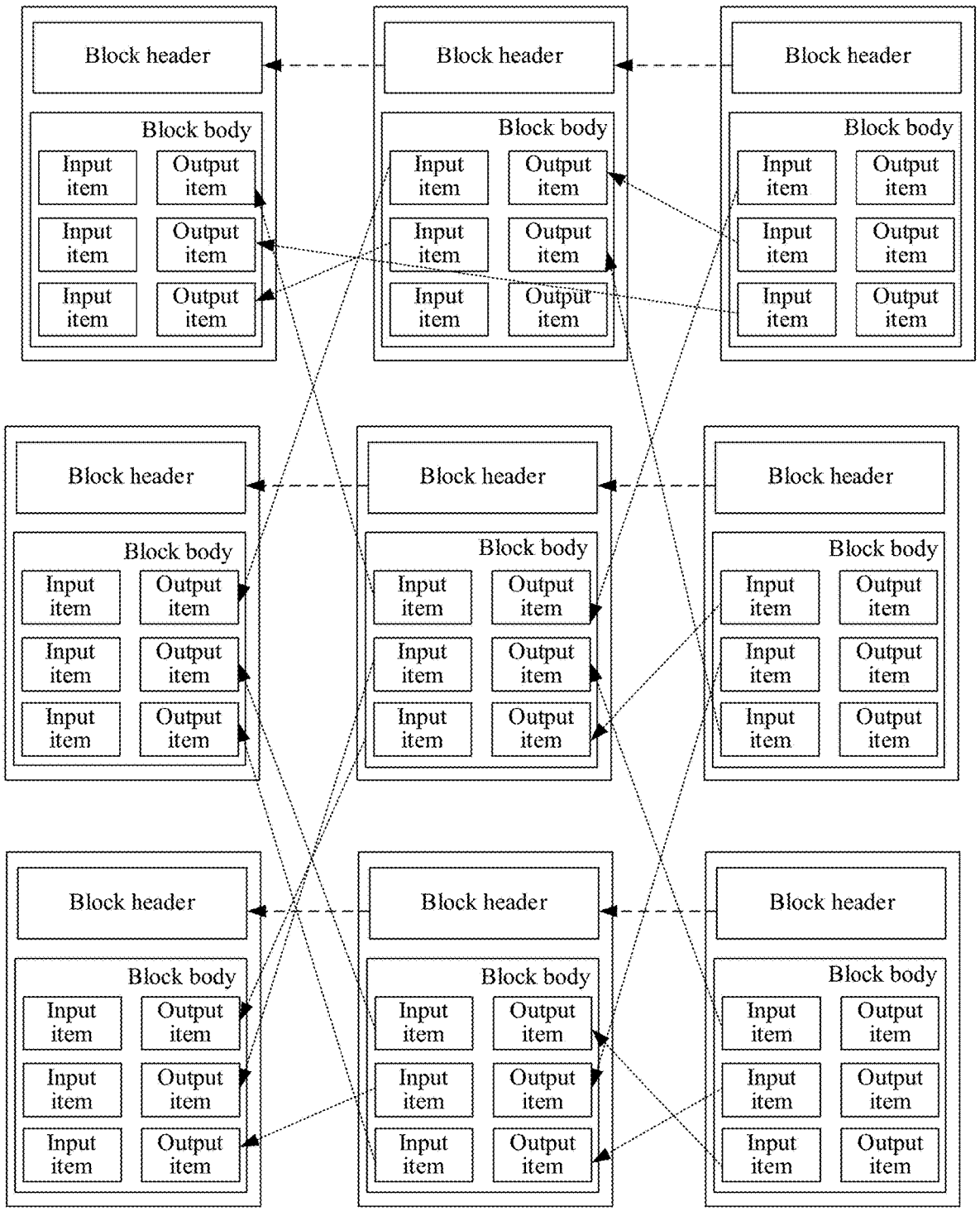
FIG. 5B shows a link relationship between an input item and an output item of transaction information in a block data structure according to an embodiment of the disclosure.

FIG. 5A and FIG. 5B respectively show links between input items of transaction information of a data block and output items of previously recorded transaction information in an existing single blockchain structure, as well as links between input items of transaction information of a data block and output items of previously recorded transaction information that may be located on different branch blockchains in a multi-branch blockchain structure of the embodiment of the disclosure.

As shown in FIG. 5A, in the existing single blockchain structure, if an input item of one piece of transaction information in a data block is linked to an output item of another transaction information, the input item needs to be linked to an output item of one piece of previously recorded transaction information in a data block on the blockchain.

As shown in FIG. 5B, in the multi-branch blockchain structure of the embodiment of the disclosure, if an input item of one piece of transaction information in a data block is linked to an output item of another transaction information, the input item is not necessarily linked to an output item of previously recorded transaction information in a data block on a given branch blockchain in which the transaction information is located, but may be linked to an output item of one piece of previously recorded transaction information of a data block in a branch blockchain other than the given branch blockchain. In this way, it is ensured that each branch blockchain shares the same process and shares the same unoccupied resources. No matter which branch blockchain occupies the resources, the branch blockchain occupies total resources of the blockchain, which is completely different from a case of the sub-blockchain.

In an embodiment, the verification result for the target data block from each of the other accounting node is generated in the following manner (which may be referred to as an output item consumption verification process):

determining whether the output item to which the input item of the transaction information in the target data block is linked is already linked to an input item of transaction information in a data block recorded on the blockchain before the target data block is recorded on the blockchain, and determining that the verification result is 'Not Passed' (that is, not verified) when the output item to which the input item of the transaction information in the target data block is linked is already linked to the input item of the transaction information in the data block recorded on the blockchain before the target data block is recorded on the blockchain; otherwise, the verification result is 'Passed' (that is, verified).

The significance of the verification is to prevent recurrence of specific transaction behaviors such as repeated reimbursement of electronic invoices. An input item of transaction information of reimbursing an electronic invoice is linked to an output item of transaction information of previously issuing the electronic invoice. If the electronic invoice has been reimbursed after a data block of the transaction information of issuing the electronic invoice is added onto the blockchain, the input item of the transaction information of reimbursing the electronic invoice is also linked to the output item of the transaction information of issuing the electronic invoice, and the transaction information in the target data block is an output item linked to the transaction information of issuing the electronic invoice, this indicates that there is a repeated reimbursement behavior, and the output item consumption verification fails.

In an embodiment, the determining whether the output item to which the input item of the transaction information in the target data block is linked is already linked to an input item of transaction information in a data block recorded on the blockchain before the target data block is recorded on the blockchain includes:

traversing input items of transaction information in all data blocks recorded on the blockchain between a time at which the target data block is recorded on the blockchain and a time at which the another data block is recorded on the blockchain, and determining one by one whether the input items are linked to the output item of the transaction information in the another data block.

Since a recording time, that is, an addition time, of a data block is recorded in a block header of the data block, recording times of the target data block and the another data block may be obtained from the target data block and the another data block. Subsequently, all data blocks recorded on the blockchain between the two recording times are found.

In an embodiment, a manner of finding all the data blocks recorded on the blockchain between the two recording times may be such that a correspondence table among all recorded data block identifiers (for example, digest values), recording times, and recorded branch blockchain identifiers is maintained in the leader accounting node. This requires that each time the leader accounting node records a data block on a branch blockchain, a recorded data block identifier (for example, a digest value), a recording time, and a recorded branch blockchain identifier are correspondingly recorded in the correspondence table. In this way, all records of which recording times are between the two recording times in the correspondence table may be searched, corresponding branch blockchains are found according to branch blockchain identifiers in the found records, and data blocks corresponding to the branch blockchains are found according to data block identifiers (for example, digest values) in the found records. The advantage of this embodiment is that, a processing speed of searching all data blocks recorded on the blockchain between the two recording times is improved through table lookup.

In another embodiment, a manner of finding all the data blocks recorded on the blockchain between the two recording times may be such that for each data block on each branch blockchain, it is determined whether a recording time in a block header of the data block is between the two recording times, and if the recording time is between the two recording times, the data block is a data block recorded on the blockchain between the two recording times. The advantage of this embodiment is that a memory of the leader accounting node is not occupied and resources are saved.

After all the data blocks recorded on the blockchain between the two recording times are found, for an input item of transaction information in each data block, it is determined whether the input items are linked to the output item of the transaction information in the another data block one by one. If it is determined that an input item is linked to the output item of the transaction information in the another data block, it indicates that a transaction has been repeated, for example, repeated reimbursement, and it is determined that the transaction information is invalid; otherwise, it is determined that the transaction information is valid.

The advantage of the manner of traversing the input items of the transaction information in all the data blocks recorded on the blockchain between the time at which the target data block is recorded on the blockchain and the time at which the another data block is recorded on the blockchain, and determining whether the input items are linked to the output item of the transaction information in the another data block one by one is that the accuracy of verifying validity of the transaction information may be improved.

In another embodiment, the determining whether the output item to which the input item of the transaction information in the target data block is linked is already linked to an input item of transaction information in a data block recorded on the blockchain before the target data block is recorded on the blockchain includes:

querying an occupancy status word (or an occupancy status) corresponding to the output item of the transaction information in the another data block to which the input item of the transaction information in the target data block is linked, and determining that the verification result is 'Not Passed' when the occupancy status word indicates an occupied state; otherwise, the verification result is 'Passed'.

Correspondingly, after operation 450, the method further includes:

setting an occupancy status word corresponding to an output item of each piece of transaction information in the target data block to indicate an unoccupied state; and setting the occupancy status word corresponding to the output item of the transaction information in the another data block to which the input item of each piece of transaction information in the target data block is linked to indicate an occupied state.

In this embodiment, each time a data block is added onto the blockchain by the leader accounting node, an occupancy status word is assigned to an output item of each piece of transaction information in the data block, the occupancy status word and the transaction information are correspondingly stored in the memory of the leader accounting node, and the occupancy status word is set to an unoccupied state, for example, the occupancy status word is set to 0. Subsequently, once any data block is added onto the blockchain, in addition to assigning occupancy status words to output items of transaction information in these data blocks and setting the occupancy status words to indicate an unoccupied state, occupancy status words corresponding to output items of transaction information in other data blocks to which input items of the transaction information are linked are set to indicate an occupied state, for example, the occupancy status words are set to 1. The occupancy status word that has been set to indicate an occupied state cannot be set to indicate an unoccupied state again, thereby avoiding recurrence of a transaction such as repeated reimbursement.

Specifically, the occupancy status word corresponding to the output item of the transaction information in the another data block to which the input item of each piece of transaction information in the block body is linked is queried, when the occupancy status word indicates an occupied state, it indicates that a transaction (for example, repeated reimbursement) may occur repeatedly, and it is determined that the verification result is 'Not Passed'; otherwise, it is determined that the verification result is 'Passed'.

The advantage of this embodiment is that the output item consumption verification may be performed quickly by querying an occupancy status word in the memory, which improves the efficiency of the output item consumption verification.

A process of data block signature verification is discussed below.

In an embodiment, operation 440 includes: recording the digest value of the previous data block recorded on the selected branch blockchain and a signature formed by encrypting the digest value by using a private key specific to the leader accounting node in the block header of the target data block.

The verification result for the target data block from each of the other accounting nodes is generated in the following manner:

decrypting the signature by using a public key specific to the leader accounting node; and comparing a result of the decryption with the digest value in the block header, and determining that the verification result is 'Passed' when the result of the decryption is consistent with the digest value; otherwise, the verification result is 'Not Passed'.

The advantage of this embodiment is that verification may be performed on accounting of the leader accounting node, so that the accounting has non-repudiation in a subsequent process. The leader accounting node signs a block body by using a private key specific to the leader accounting node, and other accounting nodes generally do not have the private key of the leader accounting node except for the leader accounting node. Therefore, if the block body and the signature may be successfully verified by using a public key of the leader accounting node, it indicates that the block body is certainly added onto the blockchain by the leader accounting node. In the future, if there is any problem in content of the block body, for example, the content is reported and tampered with, it is certainly done by the leader accounting node. Because only the leader accounting node may perform signature by using the private key, non-repudiation is ensured and the security of blockchain addition is improved.

The public key and the private key of the leader accounting node may be uniformly issued by a dedicated authorization center node (not shown).

A process of transaction information signature verification is discussed below.

The above embodiments focus on a case of signing a block body of an entire data block, and the following embodiments describe a case of signing each piece of transaction information in the block body. The signature on each piece of transaction information in the block body may be performed by a generator node of the transaction information.

In this embodiment, transaction information that needs to be added to the target data block is signed by the generator node that generates the transaction information by using a private key specific to the generator node.

In the system architecture shown in FIG. 1A, the generator node that generates the transaction information is the transaction information generator accounting node 103. In the system architecture shown in FIG. 1B, the generator node that generates the transaction information is the transaction information generator node 104 outside the group of accounting nodes 100. In the system architecture shown in FIG. 1C, the generator node that generates the transaction information is the transaction information generator service node 106 in the service node group 107.

In an embodiment, the public key and the private key specific to the generator node may be uniformly issued by a dedicated authorization center node (not shown).

In this embodiment, each piece of transaction information in the target data block is signed by a generator node that generates the transaction information by using a private key specific to the generator node, and the signature is recorded in the target data block together with the transaction information. That is, the block body not only includes transaction information, but also includes signatures corresponding to the transaction information. The transaction information and the signatures are recorded in the block body in a one-to-one correspondence.

Figure 13:
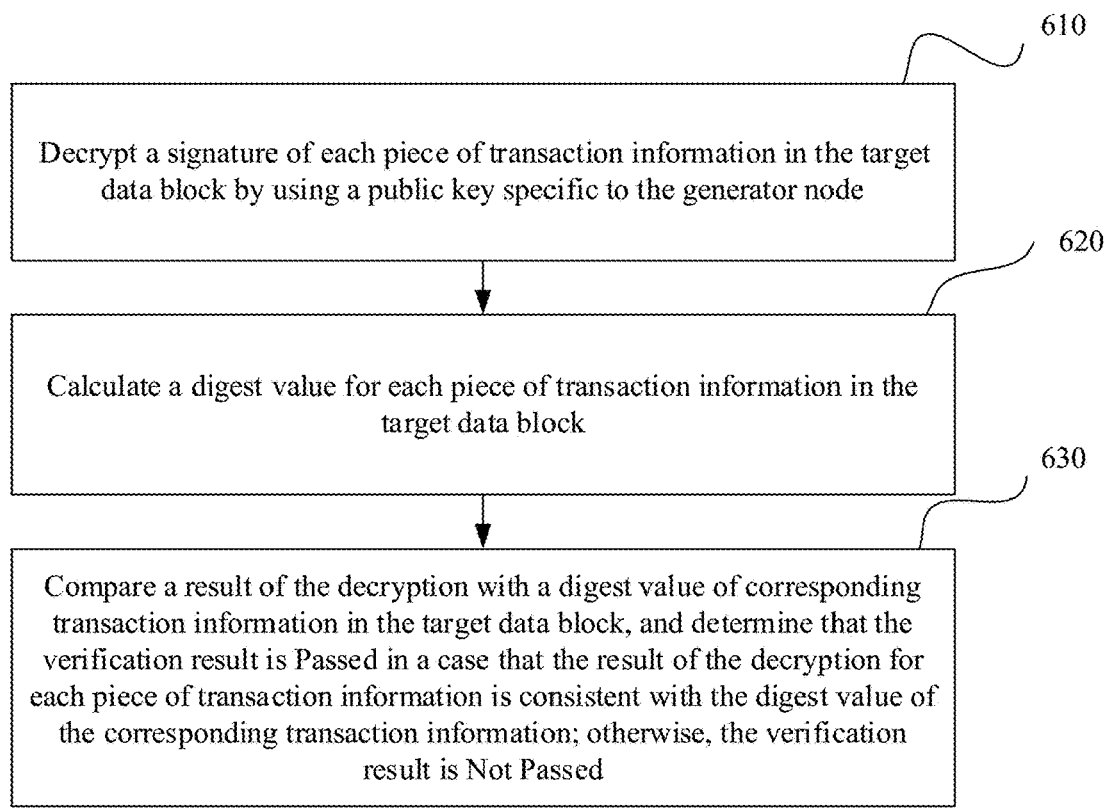
FIG. 13 is a flowchart of generating a verification result for a target data block by each of other accounting nodes according to an embodiment of the disclosure.

As shown in FIG. 13, in this embodiment, the verification result for the target data block from each of the other accounting nodes is generated in the following manner:

Operation 610. Decrypt a signature of each piece of transaction information in the target data block by using a public key specific to the generator node.

Operation 620. Calculate a digest value for each piece of transaction information in the target data block.

Operation 630. Compare a result of the decryption with a digest value of corresponding transaction information in the target data block, and determine that the verification result is 'Passed' when the result of the decryption for each piece of transaction information is consistent with the digest value of the corresponding transaction information; otherwise, the verification result is 'Not Passed'.

The purpose of the transaction information signature verification is to verify whether each piece of transaction information in a block body is actually generated by a corresponding generator node, is not tampered with, and is not lost during transmission. In this embodiment, the security of transaction information in a data block is further improved.

A process in which a transaction information generator node generates a signature of transaction information is generally as follows: generating a digest for the transaction information according to a predetermined digest algorithm, and encrypting the digest by using a private key specific to the transaction information generator node, to obtain the signature of the transaction information. Correspondingly, when second signature verification is performed, the signature of the transaction information is decrypted by using a public key specific to the transaction information generator node, then a digest is generated for the transaction information according to the same predetermined digest algorithm when the signature of the transaction information is generated, and the generated digest is compared with the digest obtained through decryption. If the two are consistent, it indicates that the transaction information is actually generated by the transaction information generator node and is not lost during transmission, and the transaction information signature verification is passed; otherwise, the transaction information signature verification is not passed.

Figure 6:
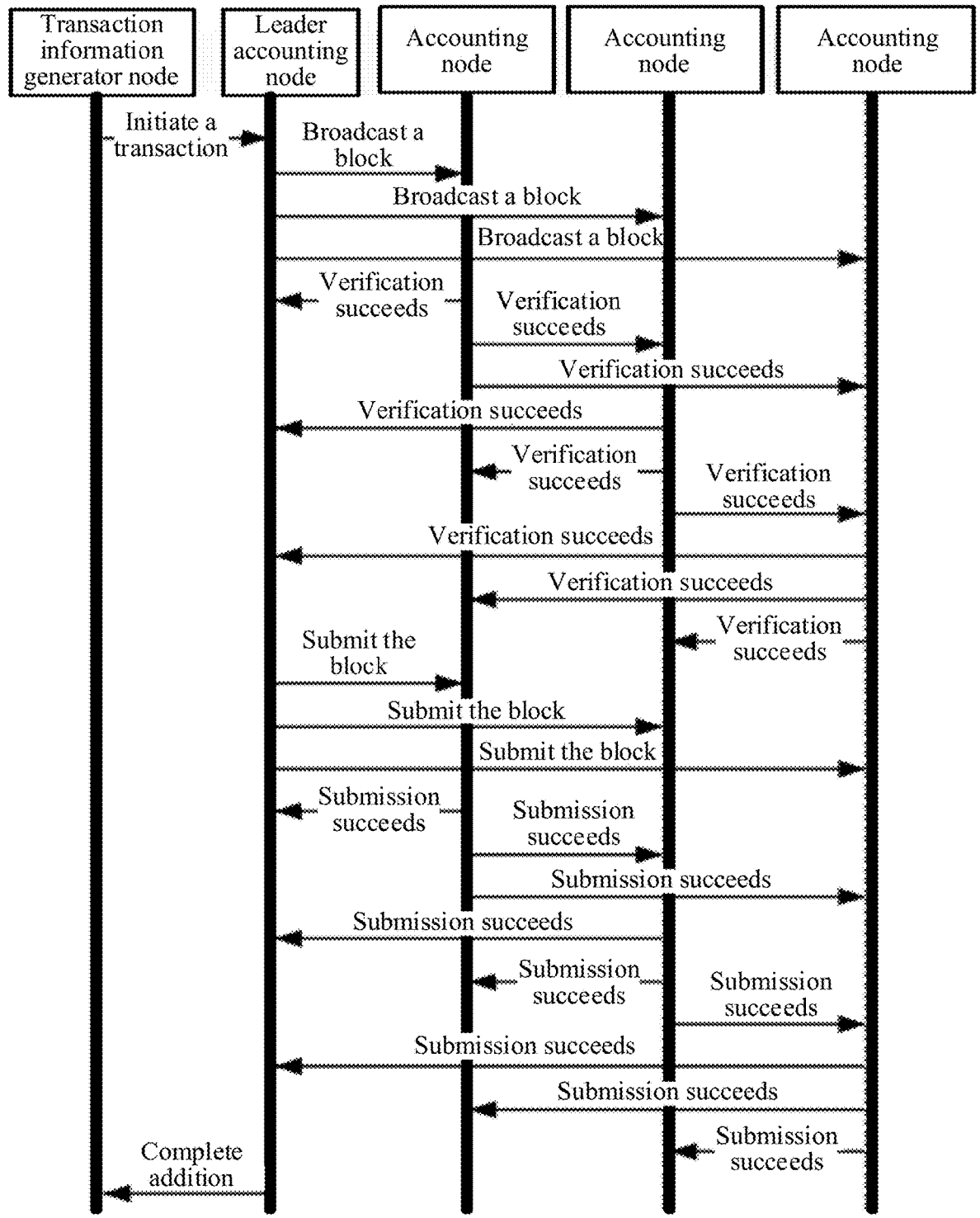
FIG. 6 shows a timing diagram of a method for recording a data block on a blockchain according to an embodiment of the disclosure.

The processes of the output item consumption verification, data block signature verification, and transaction information signature verification of the data block are all performed during verification of the other accounting nodes after the leader accounting node in FIG. 6 sends the data block that needs to be added onto the blockchain to each of the other accounting nodes. After all the verifications are passed, each accounting node on which verification is passed sends a message indicating that the verification succeeds to all other accounting nodes.

In operation 4503 in FIG. 12, the target data block is recorded on the selected branch blockchain, and the other accounting nodes in the group of accounting nodes are notified after it is determined that the verification succeeds based on the verification results, so that the other accounting nodes record the target data block on the selected branch blockchain according to the identifier of the branch blockchain in the block header.

In an embodiment, when the verification result for the target data block includes the output item consumption verification, data block signature verification, and transaction information signature verification, as long as one of the three verifications are 'Not Passed', each of the other accounting nodes sends a verification result that is 'Not Passed' to the leader accounting node. When the three verifications are 'Passed', each of the other accounting nodes sends a verification result that is 'Passed' to the leader accounting node.

In an embodiment, it is determined that the verification succeeds based on the verification results in the following manner.

If a quantity of verification results that are 'Passed' received by the leader accounting node reaches (2f+1), it is determined that the verification succeeds, f being a maximum integer smaller than (N−1)/3, N being a quantity of accounting nodes in the group of accounting nodes. When the verification results that are 'Passed' fed back by other accounting nodes exceeding a preset quantity (2f+1) are received, cooperative misbehavior of f or more accounting nodes may be prevented, and the effect of improving the security of accounting is achieved.

For example, in FIG. 6, the leader accounting node broadcasts a data block to other accounting nodes. After receiving a block body, the other accounting nodes need to perform verification. If the verification is passed, a verification result that is 'Passed' is returned. After the leader accounting node receives (2f+1) or more verification results that are 'Passed', it is determined that the verification succeeds.

Then, as shown in FIG. 6, the leader accounting node submits the target data block to a branch blockchain corresponding to an identifier of the branch blockchain in the block header. In the blockchain system, each accounting node needs to synchronize a set of the same blockchain. Therefore, the leader accounting node also needs to send the target data block to other accounting nodes in the group of accounting nodes, so that the other accounting nodes submit the target data block to the selected branch blockchain according to the identifier of the branch blockchain in the block header. In this way, the operation is completed synchronously. After performing submission successfully, each of the other accounting nodes sends a message indicating that the submission succeeds to the leader accounting node. The leader accounting node may determine that addition is completed after receiving a preset quantity (2f+1) of messages indicating that the submission succeeds sent by the other accounting nodes. Here, f is a maximum integer smaller than (N−1)/3, and N is a quantity of accounting nodes in the group of accounting nodes. The value of f indicates the quantity of accounting nodes misbehaving in the group of accounting nodes and that may be tolerated by the algorithm.

In an embodiment, after operation 420, the method further includes: when each branch blockchain has at least one data block waiting to be added onto the blockchain and for which no consensus has been reached, waiting for a consensus on the at least one data block of each of the plurality of branch blockchains, and selecting a branch blockchain that is the earliest to have a consensus reached on all the at least one data block as the branch blockchain for recording the target data block.

A precondition for operation 430 is that there is a branch blockchain having no data block waiting to be added onto the blockchain and for which no consensus has been reached. However, because there may be a large quantity of data blocks that needs to be added onto blockchain in a short period of time, there may exist a case in which there is no branch blockchain having no data block waiting to be added onto the blockchain and for which no consensus has been reached exists on all the branch blockchains, that is, all branch blockchains have at least one data block waiting to be added onto the blockchain and for which no consensus has been reached. In this case, after the consensus is reached on the data blocks of the branch blockchains, the branch blockchain that is the earliest to have a consensus reached on the data blocks may be selected as the branch blockchain for recording the target data block. The advantage of this operation is that a branch blockchain that is the earliest to have a consensus reached on data blocks may be used for data block addition immediately, which saves an data block addition time and improves the efficiency of the data block addition.

After this operation, operation 440 and operation 450 still need to be performed, that is, the processes of recording the digest value and reaching the consensus and addition still need to be performed. This part is the same as the above, and details are not described again.

FIG. 3B shows an organization form of a plurality of branch blockchains in one-dimensional arrangement, that is, a plurality of branch blockchains are sequentially arranged in an order in one dimension, for example, branch blockchain 1-branch blockchain 2-branch blockchain 3-branch blockchain 4-branch blockchain 5, which is easier to manage when a quantity of branch blockchains is relatively small. If there are thousands of branch blockchains, multi-dimensional arrangement may be a better form.

Therefore, in an embodiment, the plurality of branch blockchains are a plurality of branch blockchains arranged in an M-dimensional matrix, M is a positive integer greater than 1, an identifier of each branch blockchain is a vector of M elements, and each element represents a sequence number of the branch blockchain in a corresponding dimension.

Figure 8:
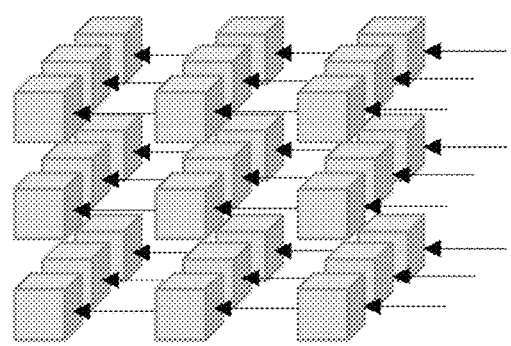
FIG. 8 shows a schematic diagram of a plurality of branch blockchains arranged in a multi-dimensional matrix.

In an example in FIG. 8, M=2, that is, a dimension is 2, and a maximum sequence number on each dimension is 3, that is, there are three sequence numbers of 1, 2, and 3 on each dimension. In this case, an identifier of each branch blockchain is a vector with two elements, a value of each vector is 1-3, and there are nine identifiers (1, 1), (1, 2), (1, 3), (2, 1), (2, 2), (2, 3), (3, 1), (3, 2), (3, 3) in total, respectively representing nine branch blockchains. Data blocks on each branch blockchain are arranged in an order in which the data blocks are recorded in the branch blockchain.

FIG. 8 shows a schematic diagram of three data blocks arranged on each branch blockchain. In fact, another quantity of data blocks may be arranged on each branch blockchain. Moreover, the branch blockchains may be arranged into a matrix with more dimensions, and each dimension may have another quantity of sequence numbers. An order of recording may be pre-specified between the branch blockchains. When a branch blockchain for recording the target data block is selected, a next branch blockchain of a branch blockchain in which a previous data block is located in the predetermined order may be used as the branch blockchain for recording the target data block. For example, in FIG. 8, the branch blockchain for recording may be selected in an order of (1, 1)-(1, 2)-(1, 3)-(2, 1)-(2, 2)-(2, 3)-(3, 1)-(3, 2)-(3, 3). When the previous data block is recorded in the branch blockchain (1, 3), the target data block is recorded in the branch blockchain (2, 1).

The multi-dimensional matrix arrangement has the advantage of improving the efficiency of branch blockchain scheduling when the quantity of branch blockchains is relatively large.

Figure 7:
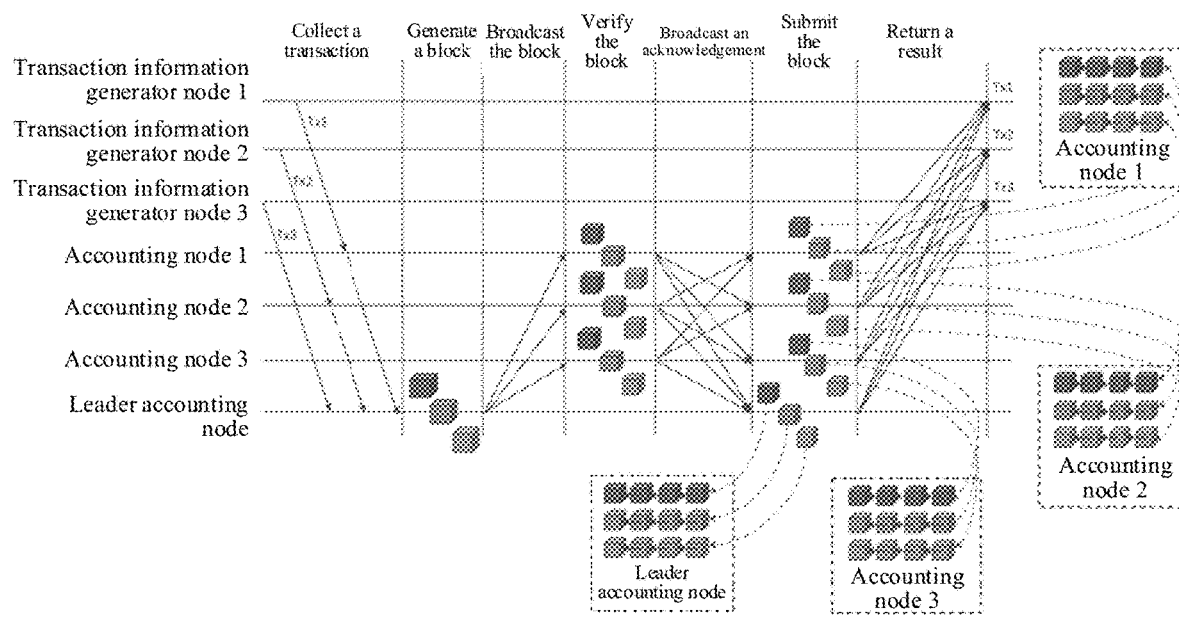
FIG. 7 shows a schematic diagram of a process of recording a data block in a multi-branch blockchain structure according to an embodiment of the disclosure.

FIG. 7 comprehensively shows an application effect of an embodiment of the disclosure. In FIG. 7, transaction information generator nodes 1 to 3 generate transaction information, and all the transaction information is sent to the leader accounting node for addition. The leader accounting node receives the transaction information and packages the transaction information when determining that a packaging condition is met. Subsequently, the leader accounting node starts to select a branch blockchain that performs recording, that is, select a branch blockchain for recording the target data block from the branch blockchains having no data block waiting to be added onto the blockchain and for which no consensus has been reached. Next, an identifier of the branch blockchain is added to a block header of a data block, and the block header of the data block is broadcast to accounting nodes 1 to 3. After receiving the data block, the accounting node 1 to 3 perform verification such as the output item consumption verification, the data block signature verification, or the transaction information signature verification, and broadcast verification results to all other accounting nodes in the group of accounting nodes. When receiving the verification results that are passed from a preset quantity of accounting nodes, the leader accounting node submits the data block to a corresponding branch blockchain according to the identifier of the branch blockchain in the block header. Each of the other accounting nodes also submits the data block to the corresponding branch blockchain according to the identifier of the branch blockchain in the block header.

It may be seen from the figure that, when selecting the branch blockchain that performs recording, the leader accounting node selects the branch blockchains having no data block waiting to be added onto the blockchain and for which no consensus has been reached, and therefore, there is no need to wait for the previous data block to be added onto the blockchain, a digest value of the lastest data block on the branch blockchain having no data block waiting to be added onto the blockchain and for which no consensus has been reached may be selected to record in the block header of the target data block, and the target data block is added onto the blockchain. Accordingly, an effect of reducing waiting time and improving the efficiency of the addition is achieved.

Figure 14:
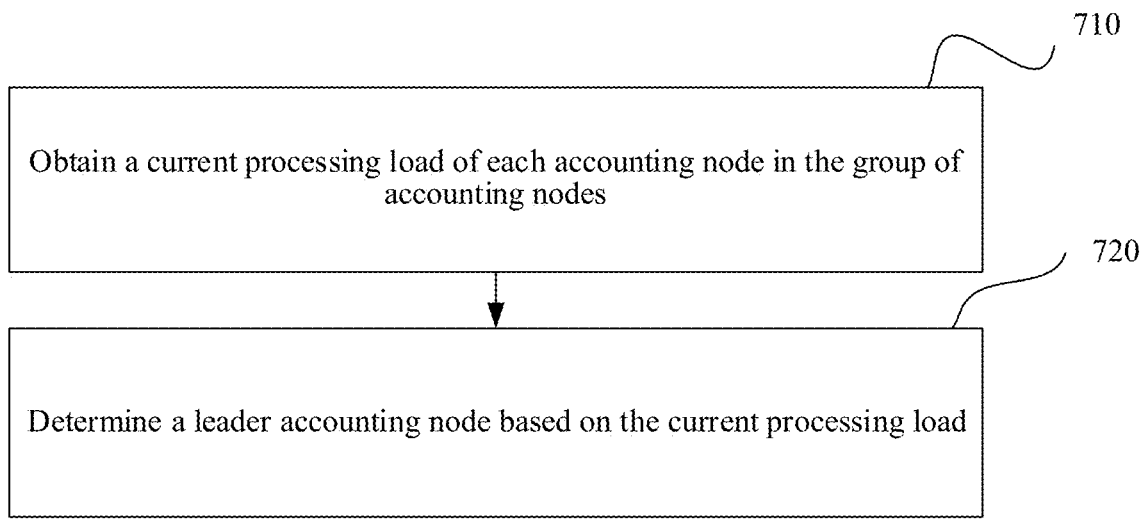
FIG. 14 shows a detailed flowchart of a process of determining a leader accounting node according to an embodiment of the disclosure.

In an embodiment, as shown in FIG. 14, the leader accounting node is selected from the group of accounting nodes in the following manner.

Operation 710. Obtain a current processing load of each accounting node in the group of accounting nodes.

Operation 720. Determine a leader accounting node based on the current processing load.

In this embodiment, the leader accounting node is not fixed, but is adjusted according to the processing load of each accounting node, thereby achieving an effect of balancing the processing loads of the accounting nodes.

The processing load is a task volume being processed by a node. The processing load may be represented by a quantity of tasks being processed by the node. In operation 710, the current processing load of each accounting node in the group of accounting nodes may be obtained in two manners of active reporting by each accounting node and passive querying.

In an embodiment of active reporting, operation 710 includes:

receiving a real-time processing load periodically broadcast by each accounting node in the group of accounting nodes; and using the received real-time processing load broadcast by each accounting node most recently as the current processing load of the accounting node.

The real-time processing load refers to a processing load broadcast by a node periodically.

When the current processing load of each accounting node in the group of accounting nodes needs to be obtained, the received and stored real-time processing load broadcast by each accounting node most recently is searched and used as the current processing load of the accounting node. For example, the accounting node broadcasts real-time processing loads to all other accounting nodes in the group of accounting nodes an interval of three seconds. The real-time processing load broadcast by the accounting node is received at 12:37:31. A current processing load of the accounting node needs to be determined at 12:37:33. It is determined that the real-time processing load broadcast by the accounting node is received most recently at 12:37:31. Therefore, the real-time processing load broadcast at 12:37:31 is used as the current processing load of the accounting node.

This embodiment of active reporting has the advantage of reducing processing overheads of querying of the leader accounting node.

In an embodiment of passive query, operation 710 includes:

transmitting a current processing load query request to each accounting node in the group of accounting nodes; and receiving a current processing load from each accounting node.

The advantage of this embodiment of passive query is that the query is started when a current processing load of an accounting node needs to be determined, the queried current processing load is a real load when the current processing load of the accounting node needs to be determined, thereby improving the accuracy of determining the current processing load of the accounting node.

In an embodiment, operation 720 includes:

determining an accounting node with the smallest current processing load as the leader accounting node.

The accounting node with the smallest processing load is likely to be an accounting node with the least workload. The accounting node with the smallest processing load is selected as the leader accounting node, which is more beneficial to balancing the workload of the accounting node.

In another embodiment, operation 720 includes:

selecting any one of accounting nodes of which current processing loads are smaller than a predetermined processing load threshold as the leader accounting node.

In this embodiment, as long as the current processing load is smaller than the predetermined processing load threshold, the accounting node may be considered as the leader accounting node. This embodiment has the advantage of preventing congestion of the accounting node with the smallest processing load caused by only selecting the accounting node with the smallest processing load.

Figure 15:
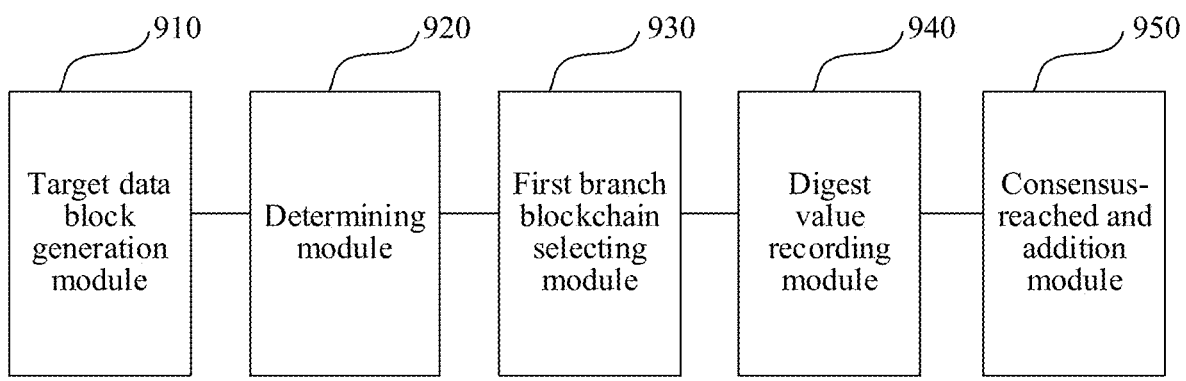
FIG. 15 shows a module diagram of a leader accounting node according to an embodiment of the disclosure.

As shown in FIG. 15, according to an embodiment of the disclosure, a leader accounting node for blockchain recording is provided, the blockchain including a plurality of branch blockchains, recording of data blocks on the plurality of branch blockchains being performed by a same group of accounting nodes, the leader accounting node being selected from the group of accounting nodes, the leader accounting node including:

a target data block generation module 910, configured to generate a target data block;

a determining module 920, configured to determine whether there is a branch blockchain having at least one data block waiting to be added onto the blockchain and for which no consensus has been reached in the plurality of branch blockchains;

a first branch blockchain selecting module 930, configured to, when there are branch blockchains having no data block waiting to be added onto the blockchain and for which no consensus has been reached, select, from the branch blockchains having no data block waiting to be added onto the blockchain and for which no consensus has been reached, a branch blockchain for recording the target data block;

a digest value recording module 940, configured to record a digest value of a previous data block recorded on the selected branch blockchain in a block header of the target data block; and a consensus-reached and addition module 950, configured to transmit the target data block to other accounting nodes in the group of accounting nodes for reaching a consensus, so as to record the target data block on the selected branch blockchain.

In an embodiment, the leader accounting node further includes:

a second branch blockchain selecting module, configured to, when the plurality of branch blockchains all have at least one data block waiting to be added onto the blockchain and for which no consensus has been reached, waiting for a consensus on the at least one data block of each of the plurality of branch blockchains, and selecting a branch blockchain that is the earliest to have a consensus reached on all the at least one data block as the branch blockchain for recording the target data block.

In an embodiment, the plurality of branch blockchains have sequence numbers. The first branch blockchain selecting module 930 is further configured to:

determine first branch blockchains from the branch blockchains having no data block waiting to be added onto the blockchain and for which no consensus has been reached, sequence numbers of the first branch blockchains being greater than a sequence number of a second branch blockchain, the second branch blockchain being a branch blockchain recording the previous data block of the target data block;

select a branch blockchain with the smallest sequence number from the first branch blockchains as the branch blockchain for recording the target data block; and when none of the branch blockchains having no data block waiting to be added onto the blockchain and for which no consensus has been reached has a sequence number greater than the sequence number of the second branch blockchain, select, from the branch blockchains having no data block waiting to be added onto the blockchain and for which no consensus has been reached, a branch blockchain with the smallest sequence number as the branch blockchain for recording the target data block.

In an embodiment, the first branch blockchain selecting module 930 is further configured to:

determine a quantity of recorded data blocks on each of the branch blockchains having no data block waiting to be added onto the blockchain and for which no consensus has been reached;

determine a time difference between a recording time of a lastest data block on each of the branch blockchains having no data block waiting to be added onto the blockchain and for which no consensus has been reached and a current time; and select, according to the quantities of recorded data blocks and the time differences from the branch blockchains having no data block waiting to be added onto the blockchain and for which no consensus has been reached, the branch blockchain for recording the target data block.

In an embodiment, the selecting, according to the quantities of recorded data blocks and the time differences from the branch blockchains having no data block waiting to be added onto the blockchain and for which no consensus has been reached, the branch blockchain for recording the target data block includes:

determine a first score for the quantity of recorded data blocks on each of the branch blockchains having no data block waiting to be added onto the blockchain and for which no consensus has been reached;

determine a second score for the time difference of each of the branch blockchains having no data block waiting to be added onto the blockchain and for which no consensus has been reached; and determine, based on a weighted sum of the first score and the second score of each of the branch blockchains having no data block waiting to be added onto the blockchain and for which no consensus has been reached, the branch blockchain for recording the target data block.

In an embodiment, the plurality of branch blockchains each have an identifier. The digest value recording module 940 is further configured to: record the digest value of the previous data block recorded on the selected branch blockchain and the identifier of the selected branch blockchain in the block header of the target data block. The consensus-reached and addition module 950 is further configured to:

transmit the target data block to the other accounting nodes in the group of accounting nodes;

receive a verification result for the target data block from each of the other accounting nodes; and record the target data block on the selected branch blockchain, and notify the other accounting nodes in the group of accounting nodes after determining that the verification succeeds based on the verification results, so that the other accounting nodes record the target data block on the selected branch blockchain according to the identifier of the branch blockchain in the block header.

In an embodiment, transaction information in the target data block includes an input item and an output item, the input item is linked to an output item of transaction information in another data block recorded on the blockchain earlier the target data block. The verification result for the target data block from each of the other accounting nodes may be generated by the consensus-reached and addition module 950 in the following manner:

determining whether the output item to which the input item of the transaction information in the target data block is linked is already linked to an input item of transaction information in a data block recorded on the blockchain before the target data block is recorded on the blockchain, and determining that the verification result is 'Not Passed' when the output item to which the input item of the transaction information in the target data block is linked is already linked to the input item of the transaction information in the data block recorded on the blockchain before the target data block is recorded on the blockchain; otherwise, the verification result is 'Passed'.

In an embodiment, the consensus-reached and addition module 950 is further configured to:

traverse input items of transaction information in all data blocks recorded on the blockchain between a time at which the target data block is recorded on the blockchain and a time at which the another data block is recorded on the blockchain, and determine one by one whether the input items are linked to the output item of the transaction information in the another data block.

In an embodiment, the consensus-reached and addition module 950 is further configured to:

query an occupancy status word (or occupancy status) corresponding to the output item of the transaction information in the another data block to which the input item of the transaction information in the target data block is linked, and determine that the verification result is 'Not Passed' when the occupancy status word indicates an occupied state; otherwise, the verification result is 'Passed';

set an occupancy status word corresponding to the output item of the transaction information in the target data block to indicate an unoccupied state; and set the occupancy status word corresponding to the output item of the transaction information in the another data block to which the input item of the transaction information in the target data block is linked to indicate an occupied state.

In an embodiment, the digest value recording module 940 is further configured to record the digest value of the previous data block recorded on the selected branch blockchain and a signature formed by encrypting the digest value by using a private key specific to the leader accounting node in the block header of the target data block. the verification result for the target data block from each of the other accounting nodes is generated in the following manner:

decrypting the signature by using a public key specific to the leader accounting node; and comparing a result of the decryption with the digest value in the block header, and determining that the verification result is 'Passed' when the result of the decryption is consistent with the digest value; otherwise, the verification result is 'Not Passed'.

In an embodiment, each piece of transaction information in the target data block is signed by a generator node that generates the transaction information by using a private key specific to the generator node, and the signature is recorded in the target data block together with the transaction information. The verification result for the target data block from each of the other accounting nodes is generated by the consensus-reached and addition module 950 in the following manner:

decrypting a signature of each piece of transaction information in the target data block by using a public key specific to the generator node;

calculating a digest value for each piece of transaction information in the target data block; and comparing a result of the decryption with a digest value of corresponding transaction information in the target data block, and determining that the verification result is 'Passed' when the result of the decryption for each piece of transaction information is consistent with the digest value of the corresponding transaction information are consistent; otherwise, the verification result is 'Passed'.

In an embodiment, the plurality of branch blockchains are a plurality of branch blockchains arranged in an M-dimensional matrix, M is a positive integer greater than 1, an identifier of each branch blockchain is a vector of M elements, and each element represents a sequence number of the branch blockchain in a corresponding dimension.

Figure 16:
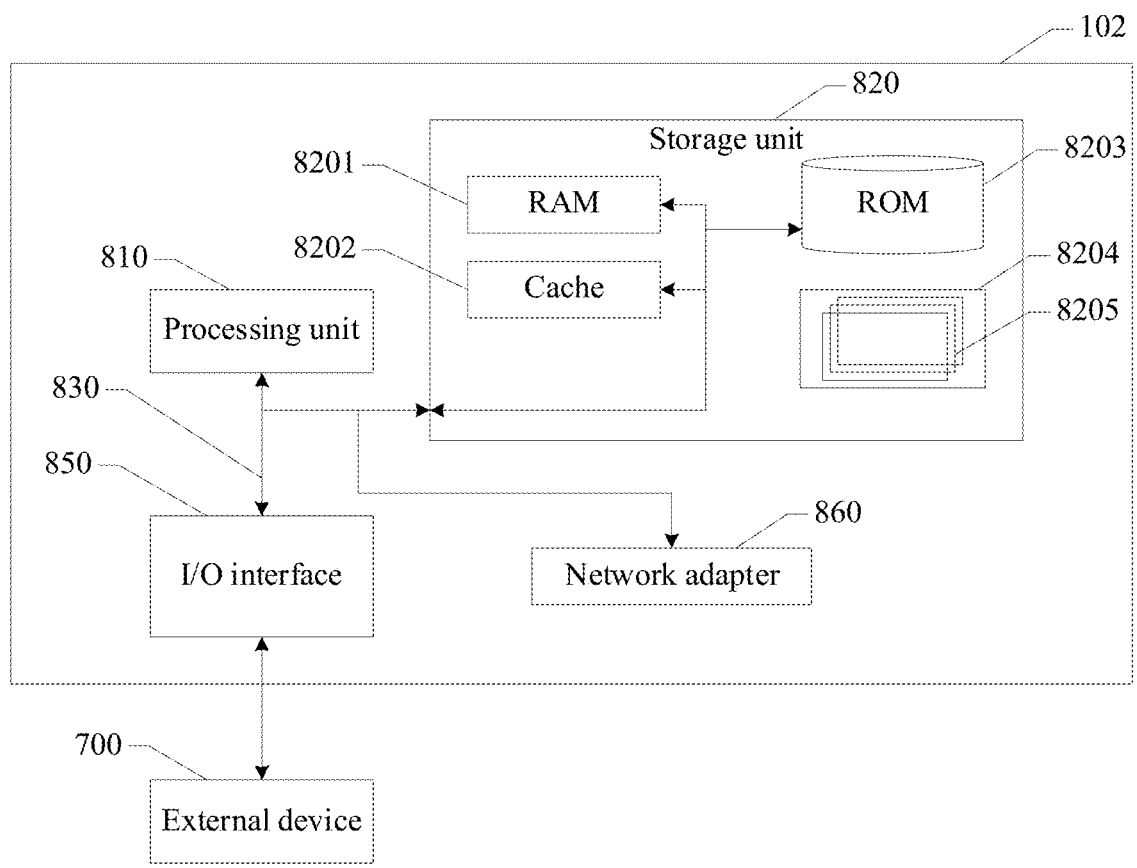
FIG. 16 shows a hardware diagram of a leader accounting node according to an embodiment of the disclosure.

The method for recording a data block in a blockchain network according to the embodiments of the disclosure may be implemented by the leader accounting node 102 of FIG. 16. The leader accounting node 102 according to this embodiment of the disclosure is described below with reference to FIG. 16. The leader accounting node 102 shown in FIG. 16 is only an example, and does not impose any limitation on the functions and scope of use of the embodiments of the disclosure.

As shown in FIG. 16, the leader accounting node 102 is represented in a form of a general-purpose computing device. Components of the leader accounting node 102 may include, but are not limited to: at least one processing unit 810, at least one storage unit 820, and a bus 830 connected to different system components (including the storage unit 820 and the processing unit 810).

The storage unit 820 stores program code, and the program code may be executed by the processing unit 810, so that the processing unit 810 performs the operations according to various exemplary implementations of the disclosure described in the descriptions of the foregoing exemplary methods of the specification. For example, the processing unit 810 may perform each operation shown in FIG. 9.

The storage unit 820 may include a readable medium in the form of a volatile storage unit, for example, a random access memory (RAM) unit 8201 and/or a cache storage unit 8202, and may further include a read-only memory (ROM) unit 8203.

The storage unit 820 may further include a program/utility tool 8204 having a group of (at least one) program modules 8205. Such a program module 8205 includes, but is not limited to, an operating system, one or more application programs, other program modules, and program data. Each or a combination of these examples may include implementation of a network environment.

The bus 830 may indicate one or more of several types of bus structures, including a storage unit bus or storage unit controller, a peripheral bus, an accelerated graphics port, a processing unit, or a local bus using any of a plurality of bus structures.

The leader accounting node 102 may alternatively communicate with one or more external devices 700 (for example, a keyboard, a pointing device, and a Bluetooth device), or may communicate with one or more devices that enable a user to interact with the leader accounting node 102 and/or communicate with any device (for example, a router or a modem) that enables the leader accounting node 102 to communicate with one or more other computing devices. Such communication may be performed by using an input/output (I/O) interface 650. In addition, the leader accounting node 102 may further communicate with one or more networks (for example, a local area network (LAN), a wide area network (WAN), and/or a public network such as the Internet) through a network adapter 860. As shown in the figure, the network adapter 860 communicates with other modules of the leader accounting node 102 by using the bus 830. It is to be understood that although not shown in the figure, other hardware and/or software modules may be used in combination with the leader accounting node 102, including, but not limited to microcode, a device drive, a redundancy processing unit, an external disk drive array, a RAID system, a tape drive, a data backup and storage system, and the like.

According to the foregoing descriptions of the implementations, a person skilled in the art would readily understand that the exemplary implementations described herein may be implemented by using software, or may be implemented by combining software and necessary hardware. Therefore, the technical solutions of the implementations of the disclosure may be implemented in the form of a software product. The software product may be stored in a non-volatile storage medium (which may be a CD-ROM, a USB flash drive, a removable hard disk, or the like) or in a network and includes several instructions for instructing a computer device (which may be a personal computer, a server, a terminal device, a network device, or the like) to perform the methods described in the implementations of the disclosure.

In the examples of the embodiments of the disclosure, a computer program medium is further provided, storing computer-readable instructions, the computer-readable instructions, when executed by a processor of a computer, causing the computer to perform some described methods according to the method embodiments.

According to an embodiment of the disclosure, a program product for implementing the methods in the foregoing method embodiments is further provided. The program product may use a portable compact disc read-only memory (CD-ROM) and include program code, and may be run on a terminal device such as a personal computer. However, the program product in the disclosure is not limited thereto. In this specification, the readable storage medium may be any tangible medium including or storing a program, and the program may be used by or used in combination with an instruction execution system, an apparatus, or a device.

The program product may be any combination of one or more readable mediums. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable disk, a hard disk, a RAM, a ROM, an erasable programmable ROM (EPROM or a flash memory), an optical fiber, a compact disc ROM (CD-ROM), an optical storage device, a magnetic storage device, or any appropriate combination thereof.

The computer-readable signal medium may include a data signal being in a baseband or transmitted as a part of a carrier, which carries readable program code. A data signal propagated in such a way may assume a plurality of forms, including, but not limited to, an electromagnetic signal, an optical signal, or any appropriate combination thereof. The readable storage medium may alternatively be any readable medium other than a readable storage medium, and the readable storage medium may be used to send, propagate, or transmit a program used by or in combination with an instruction execution system, apparatus, or device.

The program code included in the readable storage medium may be transmitted by using any suitable medium, including but not limited to a wireless medium, a wired medium, an optical cable, RF, or any appropriate combination thereof.

An embodiment of the disclosure further provides a computer program product including instructions, the computer program product, when run on a server, causing the server to perform the method according to the foregoing embodiments.

The program code used for executing the operations of the disclosure may be written by using one or more programming languages or a combination thereof. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In cases involving a remote computing device, the remote computing device may be connected to a user computing device through any type of network including a local area network (LAN) or a wide area network (WAN), or may be connected to an external computing device (for example, through the Internet by using an Internet service provider).

Although a plurality of modules or units of a device configured to perform actions are discussed in the foregoing detailed description, such division is not mandatory. In practice, according to the implementations of the disclosure, the features and functions of two or more modules or units described above may be embodied in one module or unit. On the other hand, the features and functions of one module or unit described above may be further divided to be embodied by a plurality of modules or units.

In addition, although the operations of the method in the disclosure are described in the accompanying drawings in a specific sequence, this does not require or imply that such operations need to be performed according to the specific sequence, or all shown operations need to be performed to achieve an expected result. Additionally or alternatively, some operations may be omitted, a plurality of operations may be combined into one operation for execution, and/or one operation may be decomposed into a plurality of operations for execution, and the like.

According to the foregoing descriptions of the implementations, a person skilled in the art would readily understand that the exemplary implementations described herein may be implemented by using software, or may be implemented by combining software and necessary hardware. Therefore, the technical solutions of the implementations of the disclosure may be implemented in the form of a software product. The software product may be stored in a non-volatile storage medium (which may be a CD-ROM, a USB flash drive, a removable hard disk, or the like) or in a network and includes several instructions for instructing a computing device (which may be a personal computer, a server, a mobile terminal, a network device, or the like) to perform the methods described in the implementations of the disclosure.

In the embodiments of the disclosure, a blockchain includes a plurality of branch blockchains, and recording of data blocks on the branch blockchains is performed by the same group of accounting nodes. In this way, when a target data block needs to be added onto the blockchain, the target data block may be added onto branch blockchains having no data block waiting to be added onto the blockchain and for which no consensus has been reached from the branch blockchains. When a digest of a previous data block is recorded in a block header, not the digest of the previous data block of the entire blockchain, but the digest of the previously recorded data block (consensus is reached, and there is no need to wait) on the selected branch blockchain is recorded in the block header of the target data block. In this way, the embodiments of the disclosure solve the problem of low efficiency in the related art, which is caused because a digest of a previous data block may be obtained after a consensus is reached on the previous data block on the entire blockchain, and the digest is recorded in the block header of the target data block, but once the consensus is not reached on the previous data block, waiting is performed all the time is avoided. In this manner of a plurality of branch blockchains, a block generation process is parallelized to a certain extent, thereby improving the efficiency of block generation of a system. Since a plurality of branch blockchains are accounted by the same group of accounting nodes, it is ensured that the branch blockchains are maintained in the same process. Each accounting node has all historical information of data recorded by the group of accounting nodes, thereby avoiding a shortcoming of recording incomplete data information due to cross-blockchain.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

After considering the specification and practicing the disclosure, a person skilled in the art may easily conceive of other implementations of the disclosure. This application is intended to cover any variation, use, or adaptive change of the disclosure. These variations, uses, or adaptive changes follow the general principles of the disclosure and include common general knowledge or common technical means, which are not disclosed in the disclosure, in the technology. The specification and the embodiments are considered to be merely exemplary, and the actual scope and spirit of the disclosure are subject to the appended claims.

What is claimed is:

1. A method for recording a data block on a blockchain, the blockchain comprising a plurality of branch blockchains, recording of data blocks on the plurality of branch blockchains being performed by a same group of accounting nodes, the method being performed by a leader accounting node in the group of accounting nodes, the method comprising:
generating a target data block;
determining whether the plurality of branch blockchains include a branch blockchain having at least one data block waiting to be added onto the blockchain and for which no consensus has been reached;
based on a determination that first branch blockchains, of the plurality of branch blockchains, have no data block waiting to be added onto the blockchain and for which no consensus has been reached, selecting, from the first branch blockchains, a branch blockchain for recording the target data block;
recording a digest value of a previous data block recorded on the selected first branch blockchain and an identifier of the selected first branch blockchain in a block header of the target data block; and
transmitting the target data block to other accounting nodes in the group of accounting nodes for reaching a consensus, the target data block being recorded on the selected first branch blockchain based on the consensus being reached,
wherein the transmitting the target data block to the other accounting nodes comprises:
transmitting the target data block to the other accounting nodes in the group of accounting nodes;
receiving a verification result for the target data block from each of the other accounting nodes; and
recording the target data block on the selected first branch blockchain, and notifying the other accounting nodes in the group of accounting nodes based on a determination that a verification succeeds based on verification results received from the other accounting nodes.

2. The method according to claim 1, further comprising:
based on a determination that all of the plurality of branch blockchains have the at least one data block waiting to be added onto the blockchain and for which no consensus has been reached, waiting for a consensus on the at least one data block of each of the plurality of branch blockchains, and selecting a branch blockchain, among the plurality of branch blockchains, that is the earliest to have a consensus reached on all of the at least one data block as the branch blockchain for recording the target data block.

3. The method according to claim 1, wherein each of the plurality of branch blockchains has a sequence number, and the selecting the branch blockchain for recording the target data block comprises:
determining, from the first branch blockchains, first branch blockchains of which sequence numbers are greater than a sequence number of a second branch blockchain, the second branch blockchain being a branch blockchain that records a previous data block of the target data block;
selecting a branch blockchain having a smallest sequence number from the determined first branch blockchains as the branch blockchain for recording the target data block; and based on all of the first branch blockchains having a sequence number smaller than the sequence number of the second branch blockchain, selecting, from the first branch blockchains, a first branch blockchain having a smallest sequence number as the branch blockchain for recording the target data block.

4. The method according to claim 1, wherein the selecting the branch blockchain for recording the target data block comprises:
determining a quantity of recorded data blocks on each of the first branch blockchains;
determining a time difference between a recording time of a lastest data block on each of the first branch blockchains and a current time; and
selecting, according to quantities of recorded data blocks and time differences of the first branch blockchains, the branch blockchain for recording the target data block.

5. The method according to claim 4, wherein the selecting, according to the quantities of recorded data blocks and the time differences from the first branch blockchains, the branch blockchain for recording the target data block comprises:
determining a first score for the quantity of recorded data blocks on each of the first branch blockchains;
determining a second score for the time difference of each of the first branch blockchains; and
determining, based on a weighted sum of the first score and the second score of each of the first branch blockchains, the branch blockchain for recording the target data block.

6. The method according to claim 1, wherein transaction information in the target data block comprises an input item and an output item, the input item being linked to an output item of transaction information in another data block recorded on the blockchain earlier than the target data block, and
the verification result received from each of the other accounting nodes is based on a determination whether the output item to which the input item of the transaction information in the target data block is linked is already linked to an input item of transaction information in a data block recorded on the blockchain before the target data block is recorded on the blockchain, and the verification result is 'Not Passed' based on the output item to which the input item of the transaction information in the target data block is linked being already linked to the input item of the transaction information in the data block recorded on the blockchain before the target data block is recorded on the blockchain; otherwise, the verification result is 'Passed'.

7. The method according to claim 6, wherein the determining whether the output item to which the input item of the transaction information in the target data block is linked is already linked to the input item of the transaction information in the data block recorded on the blockchain before the target data block is recorded on the blockchain comprises:
traversing input items of transaction information in all data blocks recorded on the blockchain between a time at which the target data block is recorded on the blockchain and a time at which the another data block is recorded on the blockchain, and determining one by one whether the input items are linked to the output item of the transaction information in the another data block.

8. The method according to claim 6, wherein the determining whether the output item to which the input item of the transaction information in the target data block is linked is already linked to the input item of the transaction information in the data block recorded on the blockchain before the target data block is recorded on the blockchain comprises:
querying an occupancy status corresponding to the output item of the transaction information in the another data block to which the input item of the transaction information in the target data block is linked, and determining that the verification result is 'Not Passed' based on the occupancy status indicating an occupied state; otherwise, the verification result is 'Passed',
the method further comprising, after the transmitting the target data block to the other accounting nodes:
setting an occupancy status corresponding to the output item of the transaction information in the target data block, to indicate an unoccupied state; and
setting the occupancy status corresponding to the output item of the transaction information in the another data block to which the input item of the transaction information in the target data block is linked, to indicate the occupied state.

9. The method according to claim 1, wherein the recording the digest value comprises: recording the digest value of the previous data block recorded on the selected first branch blockchain and a signature obtained by encrypting the digest value by using a private key specific to the leader accounting node in the block header of the target data block; and the verification result received from each of the other accounting nodes is based on whether a result of decryption of the signature by using a public key specific to the leader accounting node is consistent with the digest value in the block header.

10. The method according to claim 1, wherein transaction information in the target data block is signed by a generator node of the transaction information by using a private key specific to the generator node, and a signature is recorded in the target data block together with the transaction information; and
the verification result received from each of the other accounting nodes is based on whether a result of decryption of a signature of each piece of transaction information in the target data block by using a public key specific to the generator node is consistent with a digest value of corresponding piece of transaction information in the target data block.

11. The method according to claim 1, wherein the plurality of branch blockchains are arranged in an M-dimensional matrix, M being a positive integer greater than 1, an identifier of each branch blockchain being a vector of M elements, and each element of the M elements represents a sequence number of a corresponding branch blockchain in a corresponding dimension.

12. A leader accounting node in a blockchain comprising a plurality of branch blockchains, wherein data blocks are recorded on the plurality of branch blockchains by a same group of accounting nodes, and the leader accounting node is selected from the group of accounting nodes, the leader accounting node comprising:
at least one memory configured to store program code; and
at least one processor configured to read the program code and operate as instructed by the program code, the program code including:

target data block generation code configured to cause at least one of the at least one processor to generate a target data block;

determination code configured to cause at least one of the at least one processor to determine whether the plurality of branch blockchains include a branch blockchain having at least one data block waiting to be added onto the blockchain and for which no consensus has been reached in the plurality of branch blockchains;

first branch blockchain selection code configured to cause at least one of the at least one processor to, based on a determination that first branch blockchains, of the plurality of branch blockchains, have no data block waiting to be added onto the blockchain and for which no consensus has been reached, select, from the first branch blockchains, a branch blockchain for recording the target data block;

digest value recordation code configured to cause at least one of the at least one processor to record a digest value of a previous data block recorded on the selected first branch blockchain and an identifier of the selected first branch blockchain in a block header of the target data block; and consensus-reached and addition code configured to cause at least one of the at least one processor to transmit the target data block to other accounting nodes in the group of accounting nodes for reaching a consensus, the target data block being recorded on the selected first branch blockchain based on the consensus being reached, wherein the consensus-reached and addition code is further configured to cause at least one of the at least one processor to transmit the target data block to the other accounting nodes in the group of accounting nodes; receive a verification result for the target data block from each of the other accounting nodes; and record the target data block on the selected first branch blockchain, and notifying the other accounting nodes in the group of accounting nodes based on a determination that a verification succeeds based on verification results received from the other accounting nodes.

13. The leader accounting node according to claim 12, wherein the program code further comprises:

second branch blockchain selection code configured to cause at least one of the at least one processor to, based on a determination that all of the plurality of branch blockchains have the at least one data block waiting to be added onto the blockchain and for which no consensus has been reached, wait for a consensus on the at least one data block of each of the plurality of branch blockchains, and select a branch blockchain, among the plurality of branch blockchains, that is the earliest to have a consensus reached on all of the at least one data block as the branch blockchain for recording the target data block.

14. The leader accounting node according to claim 12, wherein each of the plurality of branch blockchains has a sequence number, and the first branch blockchain selection code comprises:
determination subcode configured to cause at least one of the at least one processor to determine, from the first branch blockchains, first branch blockchains of which sequence numbers are greater than a sequence number of a second branch blockchain, the second branch blockchain being a branch blockchain that records a previous data block of the target data block;
first selection subcode configured to cause at least one of the at least one processor to select a branch blockchain having a smallest sequence number from the first branch blockchains, determined by the determination subcode, as the branch blockchain for recording the target data block; and
second selection subcode configured to cause at least one of the at least one processor to, based on all of the first branch blockchains having a sequence number smaller than the sequence number of the second branch blockchain, select, from the first branch blockchains, a first branch blockchain having a smallest sequence number as the branch blockchain for recording the target data block.

15. The leader accounting node according to claim 12, wherein the first branch blockchain selection code comprises:

second determination subcode configured to cause at least one of the at least one processor to determine a quantity of recorded data blocks on each of the first branch blockchains;

third determination subcode configured to cause at least one of the at least one processor to determine a time difference between a recording time of a lastest data block on each of the first branch blockchains and a current time; and third selection subcode configured to cause at least one of the at least one processor to select, according to quantities of recorded data blocks and time differences of the first branch blockchains, the branch blockchain for recording the target data block.

16. The leader accounting node according to claim 15, wherein the third selection subcode is further configured to cause at least one of the at least one processor to: determine a first score for the quantity of recorded data blocks on each of the first branch blockchains; determine a second score for the time difference of each of the first branch blockchains; and determine, based on a weighted sum of the first score and the second score of each of the first branch blockchains, the branch blockchain for recording the target data block.

17. The leader accounting node, comprising:
a memory, storing computer-readable instructions; and
a processor, configured to read the computer-readable instructions stored in the memory to perform the method according to claim 1.

18. A non-transitory computer-readable storage medium, storing computer-readable instructions, the computer-readable instructions, when executed by a processor, causing the processor to perform a method for recording a data block on a blockchain, the blockchain comprising a plurality of branch blockchains, recording of data blocks on the plurality of branch blockchains being performed by a same group of accounting nodes, the method being performed by a leader accounting node in the group of accounting nodes, the method comprising:

generating a target data block;

determining whether the plurality of branch blockchains includes a branch blockchain having at least one data block waiting to be added onto the blockchain and for which no consensus has been reached;

based on a determination that first branch blockchains, of the plurality of branch blockchains, have no data block waiting to be added onto the blockchain and for which no consensus has been reached, selecting, from the first branch blockchains, a branch blockchain for recording the target data block;

recording a digest value of a previous data block recorded on the selected first branch blockchain and an identifier of the selected first branch blockchain in a block header of the target data block; and transmitting the target data block to other accounting nodes in the group of accounting nodes for reaching a consensus, the target data block being recorded on the selected first branch blockchain based on the consensus being reached, wherein the transmitting the target data block to the other accounting nodes comprises:

transmitting the target data block to the other accounting nodes in the group of accounting nodes;

receiving a verification result for the target data block from each of the other accounting nodes; and recording the target data block on the selected first branch blockchain, and notifying the other accounting nodes in the group of accounting nodes based on a determination that a verification succeeds based on verification results received from the other accounting nodes.

\* \* \* \* \*